US011599178B2

(12) United States Patent
Rivolta et al.

(10) Patent No.: US 11,599,178 B2
(45) Date of Patent: Mar. 7, 2023

(54) METHOD, ELECTRONIC DEVICE SYSTEM AND COMPUTER-READABLE MEDIUM FOR MANAGING TRANSITIONS BETWEEN A PLURALITY OF POWER STATES OF AN ELECTRONIC DEVICE BASED ON SENSOR DATA INDICATIVE OF A CHANGE IN AN ANGLE BETWEEN A PLANE OF BASE PORTION OF THE ELECTRONIC DEVICE AND PLANE OF A LID PORTION OF THE ELECTRONIC DEVICE

(71) Applicant: STMICROELECTRONICS S.r.l., Agrate Brianza (IT)

(72) Inventors: Stefano Paolo Rivolta, Desio (IT); Marco Bianco, Cesano Boscone (IT); Roberto Mura, Milan (IT); Federico Rizzardini, Settimo Milanese (IT); Lorenzo Bracco, Chivasso (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 10 days.

(21) Appl. No.: 17/168,110

(22) Filed: Feb. 4, 2021

(65) Prior Publication Data
US 2021/0255686 A1    Aug. 19, 2021

(30) Foreign Application Priority Data
Feb. 17, 2020    (IT) .......................... 102020000003146

(51) Int. Cl.
*G06F 1/00*    (2006.01)
*G06F 1/3206*    (2019.01)
(Continued)

(52) U.S. Cl.
CPC .......... *G06F 1/3206* (2013.01); *G06F 1/1677* (2013.01); *G06F 1/3296* (2013.01); *G06N 20/00* (2019.01)

(58) Field of Classification Search
CPC .... G06F 1/1677; G06F 1/3206; G06F 1/3296; G06N 20/00; H04M 250/12
See application file for complete search history.

(56) References Cited

U.S. PATENT DOCUMENTS 9,037,199 B1 *  5/2015  Stogaitis ............... G06F 1/1626
                                                         455/574
9,965,022 B2    5/2018  Schneider
(Continued)

FOREIGN PATENT DOCUMENTS

EP   3 358 440 A1     8/2018
EP   3 407 157 A1    11/2018
WO   2017/007641 A1   1/2017

OTHER PUBLICATIONS

Rivolta et al., "Bag Detection Using an Electrostatic Charge Sensor," U.S. Appl. No. 17/379,743, filed Jul. 19, 2021, 43 pages.
(Continued)

*Primary Examiner* — Nitin C Patel
(74) *Attorney, Agent, or Firm* — Seed Intellectual Property Law Group LLP

(57) ABSTRACT

An electronic device has sensing circuitry and control circuitry. The control circuitry generates, based on generated sensor data, information indicative of movement of the electronic device. The control circuitry generates control signals to control operation of the electronic device in a plurality of power states, including a working-power state, an intermediate-power state and a low-power state, based on the information indicative of movement.

26 Claims, 7 Drawing Sheets

(51) Int. Cl.
  *G06N 20/00* (2019.01)
  *G06F 1/16* (2006.01)
  *G06F 1/3296* (2019.01)

(56) References Cited

U.S. PATENT DOCUMENTS

| | | |
|---|---|---|
| 10,802,572 B2 | 10/2020 | Dayal et al. |
| 2007/0075965 A1* | 4/2007 | Huppi ............... H04M 1/72448 345/156 |
| 2007/0149262 A1* | 6/2007 | Navntoft ............ H04M 1/0225 455/575.3 |
| 2013/0232353 A1* | 9/2013 | Belesiu ................ G06F 1/1684 702/56 |
| 2014/0365803 A1 | 12/2014 | Pham et al. |
| 2018/0340768 A1 | 11/2018 | Zancanato et al. |

OTHER PUBLICATIONS

Microsoft, "Integrating Motion and Orientation Sensors with Windows", URL=https://docs.microsoft.com/en-us/windows-hardware/design/whitepapers/integrating-motion-and-orientation-sensors, download date Mar. 29, 2021, 81 pages.

Microsoft, "System Power States," URL=https://docs.microsoft.com/en-us/windows/win32/power/system-power-states, download date Mar. 29, 2021, 9 pages.

Rivolta et al., "Electronic Device Including Bag Detection," U.S. Appl. No. 17/144,016, filed Jan. 7, 2021, 39 pages.

\* cited by examiner

METHOD, ELECTRONIC DEVICE SYSTEM AND COMPUTER-READABLE MEDIUM FOR MANAGING TRANSITIONS BETWEEN A PLURALITY OF POWER STATES OF AN ELECTRONIC DEVICE BASED ON SENSOR DATA INDICATIVE OF A CHANGE IN AN ANGLE BETWEEN A PLANE OF BASE PORTION OF THE ELECTRONIC DEVICE AND PLANE OF A LID PORTION OF THE ELECTRONIC DEVICE

BACKGROUND

Technical Field

The present disclosure relates to a method for managing power states transitions of an electronic device, to a system for managing power states transitions of an electronic device, and to the electronic device including the system for managing power states transitions.

Description of the Related Art

Operating systems provide a comprehensive and system-wide set of power management features. This enables systems to extend battery life and save energy, reduce heat and noise. Power efficiency is particularly of interest on portable computers. Reducing system power consumption translates directly to lower energy costs and longer battery life.

Typically, operating systems support multiple power states, which are intermediate states between a "turned-off" state (the system is completely off and consumes no power) and a "full on" state (during which the system is fully usable). Common intermediate states are usually referred to as "sleep" (a low-power idle state) and "hibernate" (the system appears to be off, power consumption is reduced to the lowest level, and contents of volatile memory is saved to a hibernation file to preserve system state). From sleep and hibernate states, the power management software usually makes computers (almost) instantly accessible to user at the touch of a button or key.

For example, the Windows operating system can use power-management hardware to put the computer into a low-power sleep state instead of shutting down completely, so that the system can quickly resume working. The operating system will automatically enter the sleep state when the computer is idle or when the user presses a button to indicate that the current work session is over. To the user, the system appears to be off. While in the sleep state, the computer's processor is not executing code and no work is being accomplished for the user. However, events in the system from both hardware devices and the real-time clock can be enabled to cause the system to exit the sleep state (that is, "wake up") and quickly return to the working state.

BRIEF SUMMARY

PC makers may wish to customize power state transitions based on their needs, such as based on automatic recognition of specific events which do not require a direct interaction of the user with the computer (such as pressing a key or button, closing the lid, etc.). These events may include actions performed by the user when carrying or handling the portable computer, such as putting the computer in a bag and retrieving the computer from the bag, and the like.

In an embodiment, a method comprises: generating, based on sensor data, information indicative of movement of an electronic device, the information including information indicative of a change of inclination of the electronic device with respect to one or more planes orthogonal to a gravity vector acting on the electronic device, information indicative of a position of the electronic device on one or more of the one or more planes orthogonal to the gravity vector, and information indicative of a type of user-activity associated with the electronic device; and managing transitions of the electronic device between a plurality of power states, the plurality of power states including a working-power state, an intermediate-power state and a low-power state, wherein the managing transitions includes: managing transitions to the low-power state based on one or more of the information indicative of an inclination change or the information indicative of a type of user-activity; managing transitions to the working-power state based on the information indicative of a position of the electronic device; and managing transitions to the intermediate-power state based on the information indicative of a position of the electronic device. In an embodiment, the method comprises: responding to an indication of a change of inclination by transitioning the electronic device to the low-power state. In an embodiment, said electronic device has a base portion and a lid portion, and the generating the information indicative of a change in inclination comprises: detecting a change in an angle between a plane of the base portion and a plane of the lid portion; in response to the detecting of the change in the angle, comparing the angle to a threshold angle; and generating the information indicative of the change in inclination based on the comparison. In an embodiment, the method comprises: in response to the electronic device operating in the intermediate-power state, starting a timer; in response to receiving an indication of user interaction with the electronic device before expiration of the timer, transitioning from the intermediate-power state to the working-power state; and in response to expiration of the timer without receiving an indication of user interaction with the electronic device, transitioning from the intermediate-power state to the low-power state. In an embodiment, the method comprises: in response to the electronic device operating in the working-power state or the intermediate-power state, responding to an indication of a type of user-activity of walking by selectively transitioning to the low-power state based on the information indicative of a change of inclination. In an embodiment, the method comprises: in response to the electronic device operating in the working-power state or the intermediate-power state, responding to an indication of a type of user-activity of traveling in a vehicle by selectively transitioning to the low-power state based on the information indicative of a change of inclination. In an embodiment, the method comprises: generating at least some of the sensor data using an inertial sensor of a triaxial type having a first detection axis, a second detection axis, and a third detection axis, the sensor data including acceleration values along said first, second, and third detection axes, in response to the information indicative of a type of user-activity indicating a steady-state user-activity: acquiring respective acceleration values along the first, second and third detection axes; identifying a flat orientation of said electronic device when the respective acceleration values along the second and third detection axes are negligible with respect to the acceleration value along the first detection axis; and transitioning to the working-power state in response to identifying the flat orientation. In an embodiment, said electronic device has a base portion and a lid portion, the method comprising: identify a not-flat orientation of said electronic device when the value along the first detection axis is negligible with respect to at least one of the respective values along the second and the third detection axes; and transitioning the electronic device to the low-power state if the lid portion is closed, the not-flat orientation is identified and the information indicative of a type of user-activity indicates a steady-state user-activity. In an embodiment, said electronic device has a base portion and a lid portion, the method comprising: detecting a relative orientation of the base portion with respect to the lid portion; comparing the relative orientation with a threshold relative orientation to determine whether the lid is closed; and in response to the comparing indicating the lid is closed and the information indicative of a type of user-activity indicating one of walking, running, jogging or moving on a vehicle, transitioning the electronic device to the low-power state. In an embodiment, the method comprises: comparing the values along the first, second and third detection axes with respective detection thresholds; and determining that the respective value along a detection axis is negligible when the respective value is below the respective detection threshold. In an embodiment, said detection thresholds correspond to respective angles, formed by the first, second and third detection axes with the gravity vector, having respective values in the range 0-45 degrees. In an embodiment, said electronic device has a base portion and a lid portion, the method comprising: detecting a relative orientation of the base portion with respect to the lid portion; comparing the relative orientation with a threshold relative orientation to determine whether the lid is closed; and in response to the comparing indicating the lid is open, operating the electronic device in the working-power state. In an embodiment, said electronic device has a base portion and a lid portion, the method comprising: detecting a relative orientation of the base portion with respect to the lid portion; comparing the relative orientation with a threshold relative orientation to determine whether the lid is closed; in response to the comparing indicating the lid is closed and the information indicative of a type of user-activity indicating one of walking or running, determining whether the electronic device is hand-held based on the sensor data; in response to determining the electronic device is not hand-held, operating the electronic device in the low-power state; and in response to determining the electronic device is hand held, operating the electronic device is one of the intermediate-power state and the working-power state. In an embodiment, the determining whether the electronic device is hand-held includes implementing a Machine Learning algorithm.

In an embodiment, an electronic device comprises: sensing circuitry, which, in operation, generates sensor data; and control circuitry coupled to the sensing circuitry, wherein the control circuitry, in operation: generates, based on generated sensor data, information indicative of movement of the electronic device, the information including information indicative of a change of inclination of the electronic device with respect to one or more planes orthogonal to a gravity vector acting on the electronic device, information indicative of a position of the electronic device on one or more of the one or more planes orthogonal to the gravity vector, and information indicative of a type of user-activity associated with the electronic device; and generates control signals to control operation of the electronic device in a plurality of power states, the plurality of power states including a working-power state, an intermediate-power state and a low-power state, wherein the generating control signals includes: generating control signals to cause operation in the low-power state based on one or more of the information indicative of an inclination change or the information indicative of a type of user-activity; generating control signals to cause operation in the working-power state based on the information indicative of a position of the electronic device; and generating control signals to cause operation in the intermediate-power state based on the information indicative of a position of the electronic device. In an embodiment, the control circuitry, in operation, responds to an indication of a change of inclination by transitioning the electronic device to the low-power state. In an embodiment, the electronic device comprises a base portion and a lid portion, wherein the generating the information indicative of a change in inclination comprises: detecting a change in an angle between a plane of the base portion and a plane of the lid portion; in response to the detecting of the change in the angle, comparing the angle to a threshold angle; and generating the information indicative of the change in inclination based on the comparison. In an embodiment, the control circuitry, when the electronic device is operating in the intermediate-power state: starts a timer; in response to receiving an indication of user interaction with the electronic device before expiration of the timer, transitions from the intermediate-power state to the working-power state; and in response to expiration of the timer without receiving an indication of user interaction with the electronic device, transitions from the intermediate-power state to the low-power state. In an embodiment, the control circuitry, when the electronic device is operating in the working-power state or in the intermediate-power state: responds to an indication of a type of user-activity of walking by selectively transitioning to the low-power state based on the information indicative of a change of inclination; and responds to an indication of a type of user-activity of traveling in a vehicle by selectively transitioning to the low-power state based on the information indicative of a change of inclination. In an embodiment, the sensing circuitry comprises an inertial sensor of a triaxial type having a first detection axis, a second detection axis, and a third detection axis, wherein the control circuitry, in operation, responds to the information indicative of a type of user-activity indicating a steady-state user-activity by: acquiring respective acceleration values along the first, second and third detection axes; identifying a flat orientation of said electronic device when the respective acceleration values along the second and third detection axes are negligible with respect to the acceleration value along the first detection axis; and transitioning to the working-power state in response to identifying the flat orientation. In an embodiment, the electronic device comprises a base portion and a lid portion, wherein the control circuitry, in operation: identifies a not-flat orientation of said electronic device when the value along the first detection axis is negligible with respect to at least one of the respective values along the second and the third detection axes; and transitions the electronic device to the low-power state in response to the lid portion being closed, the not-flat orientation being identified and the information indicative of a type of user-activity indicating a steady-state user-activity. In an embodiment, the electronic device comprises a base portion and a lid portion, wherein the control circuitry, in operation: detects a relative orientation of the base portion with respect to the lid portion; compares the relative orientation with a threshold relative orientation to determine whether the lid is closed; and generates the control signals based on the comparing. In an embodiment, the control circuitry, in operation: determines whether the electronic device is hand-held based on the sensor data; and generates the control signals based on the determination of whether the electronic device is hand-held. In an embodiment, the control circuitry, in operation, implements a machine learning algorithm to determine whether the electronic device is hand-held.

In an embodiment, a system comprises: an application processor; sensing circuitry, which, in operation, generates sensor data; and control circuitry coupled to the sensing circuitry and to the application processor, wherein the control circuitry, in operation: generates, based on generated sensor data, information indicative of movement of the system, the information including information indicative of a change of inclination of the system with respect to one or more planes orthogonal to a gravity vector acting on the system, information indicative of a position of the system on one or more of the one or more planes orthogonal to the gravity vector, and information indicative of a type of user-activity associated with the system; and generates control signals to control operation of the system in a plurality of power states, the plurality of power states including a working-power state, an intermediate-power state and a low-power state, wherein the generating control signals includes: generating control signals to cause operation in the low-power state based on one or more of the information indicative of an inclination change or the information indicative of a type of user-activity; generating control signals to cause operation in the working-power state based on the information indicative of a position of the system; and generating control signals to cause operation in the intermediate-power state based on the information indicative of a position of the system. In an embodiment, the system comprises a base portion and a lid portion, wherein the control circuitry, in operation: detects a relative orientation of the base portion with respect to the lid portion; compares the relative orientation with a threshold relative orientation; and generates the control signals based on the comparing. In an embodiment, the control circuitry, in operation: classifies user activity based on the sensor data; and generates the control signals based on the classifying.

In an embodiment, a non-transitory computer-readable medium's contents configure an electronic device to perform a method, the method comprising: generating, based on sensor data, information indicative of movement of the electronic device, the information including information indicative of a change of inclination of the electronic device with respect to one or more planes orthogonal to a gravity vector acting on the electronic device, information indicative of a position of the electronic device on one or more of the one or more planes orthogonal to the gravity vector, and information indicative of a type of user-activity associated with the electronic device; and managing transitions of the electronic device between a plurality of power states, the plurality of power states including a working-power state, an intermediate-power state and a low-power state, wherein the managing transitions includes: managing transitions to the low-power state based on one or more of the information indicative of an inclination change or the information indicative of a type of user-activity; managing transitions to the working-power state based on the information indicative of a position of the electronic device; and managing transitions to the intermediate-power state based on the information indicative of a position of the electronic device. In an embodiment, the contents comprising instructions executed by control circuitry of the electronic device. In an embodiment, the electronic device comprises a base portion and a lid portion, and the method comprises: detecting a relative orientation of the base portion with respect to the lid portion; comparing the relative orientation with a threshold relative orientation; and generating the control signals based on the comparing.

BRIEF DESCRIPTION OF THE SEVERAL VIEWS OF THE DRAWINGS

For a better understanding of the present disclosure, embodiments thereof will now be described purely by way of non-limiting example with reference to the appended drawings, wherein.

DETAILED DESCRIPTION

Figure 1:
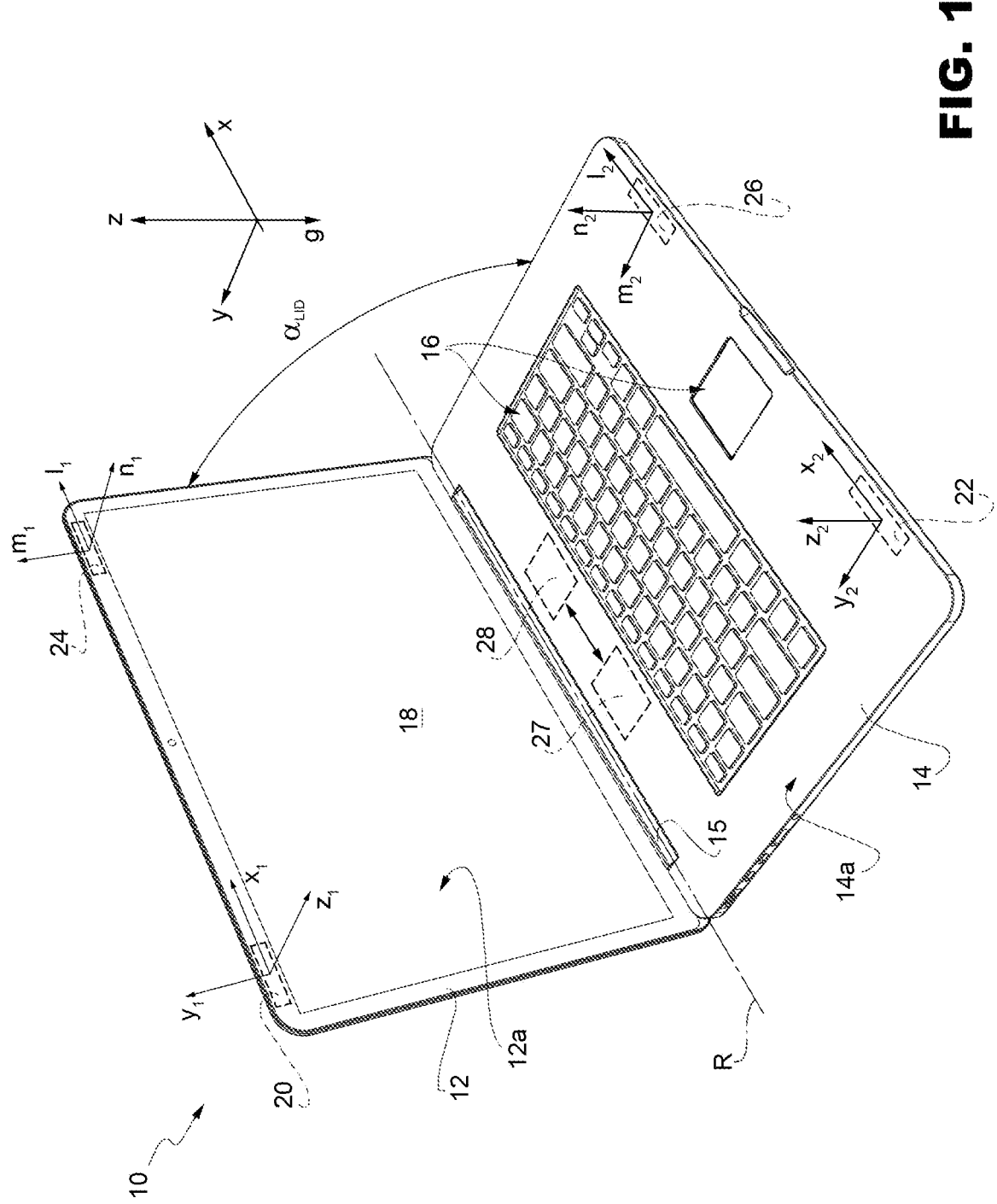
FIG. 1 shows an electronic device, in particular a notebook.

FIG. 1 illustrates a computing device 10 in a triaxial reference system X, Y, Z in which the vector g represents the gravitational-acceleration vector acting parallel to the axis Z. The computing device 10 is depicted as a notebook in an exemplary embodiment, which is used to describe the present disclosure, and does not limit the present disclosure to the specific structure shown.

The computing device 10, generally of a portable type, as illustrated includes a lid portion 12 and a base portion 14, mechanically coupled together by means of a hinge 15 that allows the lid portion 12 to rotate with respect to the base portion 14, thus forming a rotational constraint about an axis R parallel to the axis X. The computing device 10 is shown in an operating condition where the lid is open. The base portion 14 comprises a data-input device 16 (or a number data-input of devices) (e.g., a keyboard and/or a trackpad), which extend over a surface 14a of the base portion 14. The lid portion 12 comprises a display region 18 (e.g., a screen or monitor) that extends over a surface 12a of the lid portion 12.

In an embodiment, the lid portion 12 houses (e.g., incorporates within it) an inertial sensor, or motion sensor, 20, in particular an accelerometer, configured to detect and/or calculate values of acceleration of the lid portion 12 along respective detection axes $x_1$, $y_1$, $z_1$. Sensor data, which are generated by the sensor 20 for each detection axis $x_1$, $y_1$, $z_1$, may be a time series, where the ordinate axis denotes acceleration (measured in units of gravitation force, g, where 1 g=9.81 m/s$^2$) and where the abscissa axis denotes time (measured in seconds). The sensor 20 may be configured to sense vibration or acceleration of the device 10 in each detection axis $x_1$, $y_1$, $z_1$. For example, the sensor 20 may generate sensor data that is indicative of vibration or acceleration of the device 10 in the lateral axis ($x_1$), longitudinal axis ($y_1$), and vertical or normal axis ($z_1$), respectively. The sensor data may be generated by sampling an analog signal sensed by the sensor 20. In such embodiments, the sensor 20 may include a sampling circuit therein. The sampling circuit may be implemented using one or more sampling circuits known in the art (e.g., a sample-and-hold circuit).

In another embodiment, the base portion 14 houses (e.g., incorporates within it) an inertial sensor, or motion sensor, 22, in particular an accelerometer, configured to detect and/or calculate values of acceleration of the base portion 14 along corresponding detection axes $x_2$, $y_2$, $z_2$. Sensor data, which are generated by the sensor 22 for each detection axis $x_2$, $y_2$, $z_2$, may be a time series, where the ordinate axis denotes acceleration (measured in units of gravitation force, g, where 1 g=9.81 m/s2) and where the abscissa axis denotes time (measured in seconds). The sensor 22 may be configured to sense vibration or acceleration of the device 10 in each detection axis $x_2$, $y_2$, $z_2$. For example, the sensor 22 may generate sensor data that is indicative of vibration or acceleration of the device 10 in the lateral axis ($x_2$), longitudinal axis ($y_2$), and vertical or normal axis ($z_2$), respectively. The sensor data may be generated by sampling an analog signal sensed by the sensor 22. In such embodiments, the sensor 22 may include a sampling circuit therein. The sampling circuit may be implemented using one or more sampling circuits known in the art (e.g., a sample-and-hold circuit).

In general, the sensors 20, 22 are adapted to detect a movement of the computing device 10 by measuring an acceleration. The sensors 20, 22 are, for example, accelerometers manufactured using MEMS technology.

According to the present disclosure, both the lid portion 12 and the base portion 14 may house the respective inertial sensor 20, 22; or only the lid portion 12 houses the inertial sensor 20 (the base portion 14 does not include any inertial sensor); or only the base portion 14 houses the inertial sensor 22 (the lid portion 12 does not include any inertial sensor).

More in detail, the first and/or the second inertial sensors 20, 22 are adapted to detect variations of the orientation of the computing device 10 in the triaxial system with respect to a state of rest, or vibrations to which the computing device 10 is subjected, for example, caused vibrations by a movement (e.g., walking or run) of the user carrying the computing device 10 or caused by a means of transport (e.g., a car or bicycle) by which the computing device 10 is transported. Other movements, that the first and the second accelerometers 20, 22 may detect, include rotations in terms of time varying gravity projection imparted by the user on the computing device 10, and the change of a mutual position between the lid portion 12 and the base portion 14 (for example, due to opening and closing of the lid portion, which rotates about the axis R as a result of the presence of the hinge 15).

According to one aspect of the present disclosure, the lid portion 12 moreover houses (e.g., incorporates within it) a third inertial sensor 24, in particular a gyroscope, configured to detect and/or calculate an orientation and rotation of the lid portion 12 along and about detection axes $l_1$, $m_1$, $n_1$ that are parallel to the detection axes $x_1$, $y_1$, $z_1$, respectively, of the first accelerometer 20; and/or the base portion 14 moreover houses (e.g., incorporates within it) a fourth inertial sensor 26, in particular a gyroscope, configured to detect and/or calculate an orientation and rotation of the base portion 14 along and about detection axes $l_2$, $m_2$, $n_2$ that are parallel to the detection axes $x_2$, $y_2$, $z_2$, respectively, of the second accelerometer 22.

The computing device 10 moreover comprises a calculating unit, or control circuit, 27 and a memory 28, which are coupled together. The calculating unit 27 and/or the memory 28 are also operatively coupled to the first and the second accelerometers 20, 22, and (when present) to the first and to the second gyroscopes 24, 26, to receive therefrom the respective operating signals generated at output (the signals of acceleration/angular rate generated according to operation of the accelerometers and of the gyroscopes, which are per se known).

According to the present disclosure, the signals or data generated at output by the inertial sensors are used by the calculating unit 27 to acquire information related to events, or conditions, to which the computing device 10 is subjected during use.

Such information may include:

Lid status: keeps track of lid state (open or close). The lid is "open" when the opening angle, or lid angle, αLID formed between the surface of the lid portion 12 (corresponding to the display 18) and the surface of the base portion 14 (corresponding to the keyboard 16) is higher than a threshold (e.g., chosen in the range 0°-30°); and the lid is "closed" when the angle αLID is lower than that threshold (i.e., the surface of the lid portion 12 is almost parallel to, and directly facing, the surface of the base portion 14).

Activity recognition: detects if the user carrying or transporting the computing device 10 is in a rest or steady state, or instead is walking or jogging, biking, or is in/on a motorized vehicle, or is otherwise moving.

On-table detection: detects whether the computing device 10 is positioned, or rest, on a stable supporting element (e.g., a table), or instead held on user's lap. On-table detection can be useful to manage thermal policies of the device 10, since when the device 10 is positioned on a user's lap thermal generation should be reduced in order not to harm the user.

Flat-position detection: detects if the computing device 10 is positioned on a flat supporting element. This condition may be detected, for example, when:
(i) the base portion 14 lays on, or parallel to, the XY plane, so that $z_2$ is parallel to the gravity vector g (alternatively, $z_2$ is parallel to Z axis), the vector component of $x_2$ parallel to the gravity vector g is about 0 (alternatively $x_2$ is parallel to X axis), and the vector component of $y_2$ parallel to the gravity vector g is about 0 (alternatively $y_2$ is parallel to Y axis); and/or
(ii) the lid portion 12 is closed and axes $x_1$, $y_1$, $z_1$ are parallel to axes $x_2$, $y_2$, $z_2$ described above.

"In-bag" and "out-from-bag" gestures: estimate if and when the device is inserted to or removed from a carrying bag (or backpack, or the like), and placed on a supporting element (e.g., a desk, a docking station) or hold on user's lap, with the lid 12 still closed.

The "on-table" information and the "steady state" information may be used alternative to one another in the context of embodiments of the present disclosure.

According to an aspect of the present disclosure, the calculating unit 27 is configured to detect each of the above-listed events or conditions and to trigger the passage from one functioning state of the computing device 10 to another functioning state, in order to efficiently and automatically manage the energy consumption.

Figure 2:
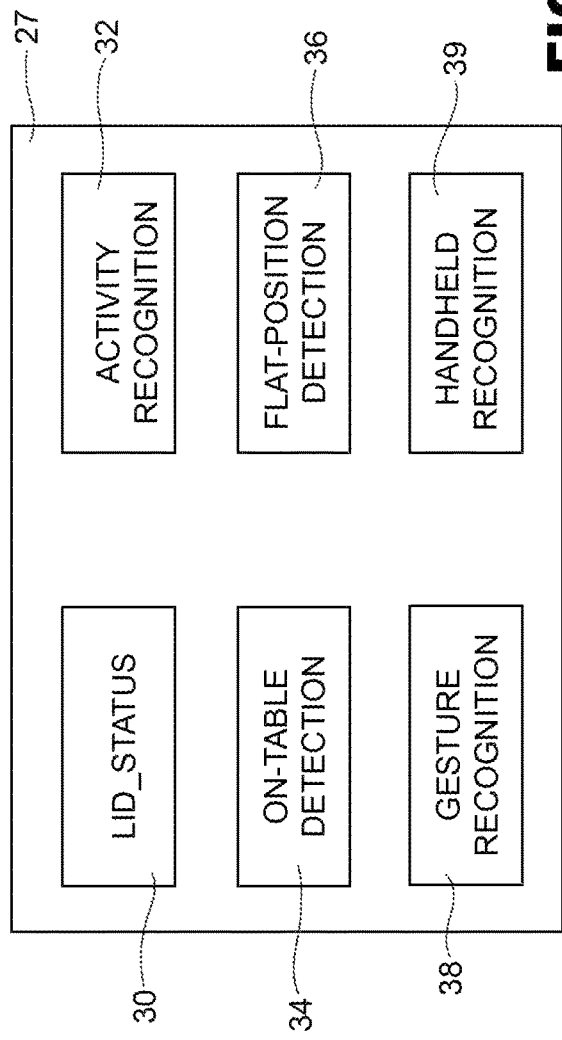
FIG. 2 shows schematically modules or circuits used to recognise respective events or conditions or activities to which the device of FIG. 1 is subjected during use.

To this regard, as better detailed in the following, the calculating unit 27 runs algorithms or software modules configured to identify each of the above events or conditions, namely (reference is made to FIG. 2): a lid status module or circuit 30, configured to evaluate whether the lid 12 is open or closed; an activity recognition module or circuit 32, configured to detect if the user carrying or transporting the computing device 10 is in a rest or steady state, or instead is walking or jogging, biking, or is in/on a motorized vehicle, or is otherwise moving; an on-table detection module or circuit 34, configured to detect if the computing device 10 is positioned, or rest, on a stable supporting element; a flat-position detection module or circuit 36, configured to detect if the computing device 10 is positioned on a flat supporting element; a gesture-recognition module or circuit 38, configured to detect if the computing device 10 is placed in or removed from a carrying bag/backpack (or the like); and a handheld module or circuit 39, configured to detect or recognize if the computing device 10 is held (e.g., by hands, or under the arm) by a user who is walking, with the lid closed.

Based on the event or condition identified, the calculating unit 27 issues a control signal adapted to instruct the power supply of the device 10 to power the device 10 according to a specific power state (e.g., a working state or a power saving state, such as those detailed hereunder). It is apparent that the calculating unit 27 can be directly coupled to the power supply, to instruct the power supply directly, or can be indirectly coupled to the power supply (e.g., through one or more intermediate components/systems), to instruct the power supply indirectly.

Figure 3:
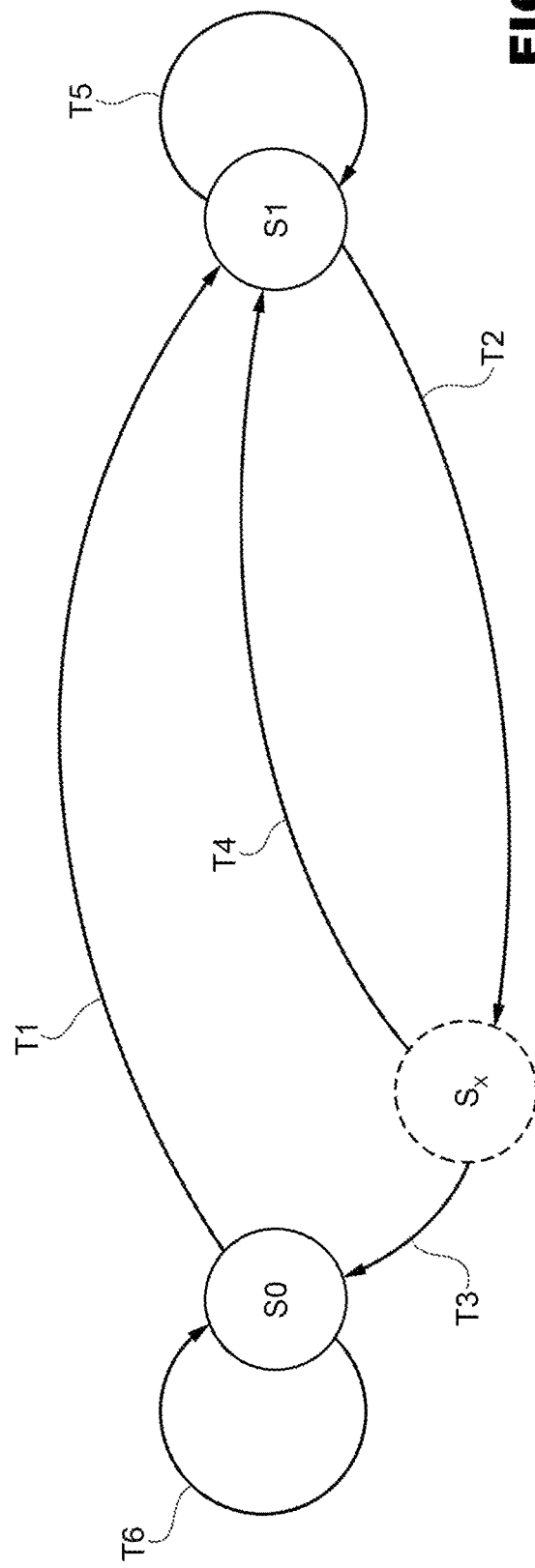
FIG. 3 is a state diagram showing transitions between power states of the electronic device of FIG. 1.

FIG. 3 shows a state diagram detailing state transitions of the computing device 10 according to the present disclosure.

State S0 in FIG. 3 is a working, or fully powered, state of computing device 10. During the working state S0, the computing device 10 is awake and running. In simple terms, the computing device 10 is "on." Whether the screen is on or off, the device is in a full running state.

State S1 in FIG. 3 is a sleep or hibernate state, or generally a state during which power consumption is reduced with respect to state S0. For example, during sleep state, the system remains partially running, and any volatile memory is kept refreshed to maintain the system state. Some components may remain powered (e.g., keyboard, LAN, USB device, etc.). During the hibernate state, all the contents of memory are stored (e.g., written to a file) to preserve the state of the operating system, applications and components; moreover the user session is closed and the user state is saved.

FIG. 3 shows a further state, named Sx, which is a transitory, or intermediate, state between S1 and S0. State Sx is a working state of computing device 10 (although the device 10 may not be fully powered in state Sx) during which, for example, some process background tasks are carried out. In general, state Sx is a state of intermediate power consumption between state S1 and state S0 (higher power consumption than S1 and lower power consumption than S0). The amount of power consumption, or the tasks actually carried out, during state Sx may vary, and may be freely configurable by the manufacturer of computing device 10.

In a possible alternative embodiment, state Sx may be a state in which device 10 is fully powered, analogously to state S0.

During use of computing device 10, there may be the need to trigger a transition from working state S0 to low-power state S1 (transition T1 in FIG. 3). Transition T1 occurs when the calculating unit 27 identifies that computing device 10, which was in state S0 and actually used by the user, may now be in a different condition, in which the user is no more using the device 10. Transition to power saving mode (low-power state S1) may therefore be employed.

The following scenarios lists the parameters based on which the calculating unit 27 may decide to control a transition T1 from state S0 to state S1.

Scenario (i)—Device 10 is in a bag, stationary on a supporting element (for example, on the floor, on a chair, etc.).

The flat-position detection module 36 detects that the computing device 10 is in a "not-flat" orientation, e.g., one among axes $x_1$, $y_1$ (or one among axes $x_2$, $y_2$) of accelerometer 20 (respectively, accelerometer 22) is parallel to the gravity vector g. The lid status module 30 detects that the lid portion 12 is closed. The activity recognition module 32 detects that the device is in a steady state (the user is not carrying or moving the device 10).

Scenario (ii)—Device 10 is carried by a user walking to a destination.

The lid status module 30 detects that the lid 12 is closed. The activity recognition module 32 detects that the device is moving (e.g., the user is moving, namely walking, with the device 10). It is noted that in scenario (ii) it is irrelevant the orientation of the computing device 10 in the triaxial system X, Y, Z and with respect to the gravity vector g. In particular, the output from the flat-position module 36 is not used, since the signals from the activity recognition module 32 and the lid status module 30, identifying that the user is walking with the device's lid closed, is sufficient to exclude any resting state in a flat position of device 10.

Scenario (iii)—Device 10 is carried by a user who is driving to a destination (or equivalently is on a bus or other means of transport or vehicle).

The lid status module 30 detects that the lid 12 is closed. The activity recognition module 32 detects that the device is moving (e.g., the user is moving on a means of transport with the device 10). It is noted that in scenario (iii) it is irrelevant the orientation of the computing device 10 in the triaxial system X, Y, Z and with respect to the gravity vector g. In particular, the output from the flat-position module 36 is not used, since the signals from the activity recognition module 32 and the lid status module 30, identifying that the user is moving on a vehicle with the device's lid closed, is sufficient to exclude any resting state in a flat position of device 10.

In the above scenarios (i)-(iii), the on-table detection module 34 is not used to detect if the computing device 10 is in the bag; the activity recognition module 32 is used instead. It is apparent that analogous information may be acquired through the on-table detection module 34.

During use of computing device 10, there may also be the need to trigger a transition from low-power state S1 to working state S0 (transition T2 in FIG. 3). Transition T2 occurs when the calculating unit 27 identifies that computing device 10, which was in state S1 and not used by the user, may now be in a different condition, in which the user needs to use the device 10. Transition to a fully powered mode (working state S0) may therefore be desired.

The following scenarios lists the parameters based on which the calculating unit 27 may decide to control a transition T2 from state S1 to state S0. As disclosed hereunder, the transition from state S1 to state S0 foresees the passage through intermediate state Sx.

Scenario (iv)—Device 10 is taken out from a bag and put on a desk or other support.

The gesture recognition module 38 identifies/recognizes a gesture of moving the device 10 from the bag (or the like) to a supporting surface, like a desk.

This event is identified based on the assumption that, when in the bag and carried by the user, the device 10 is in a "not-flat" orientation, e.g., one among axes $x_1$, $y_1$ (or one among axes $x_2$, $y_2$) of accelerometer 20 (respectively, accelerometer 22) is parallel to the gravity vector g. The act of taking the device 10 out of the bag to use it, implies that the device will be set on a desk in a substantially flat orientation, axis $z_1$ (or axis $z_2$) of accelerometer 20 (respectively, accelerometer 22) is parallel to the gravity vector g, and at the same time, signals related to axes $x_1$, $y_1$ from accelerometer 20 (or axes $x_2$, $y_2$ from accelerometer 22) are almost zero.

When the signals acquired from the accelerometer 20 (and/or from accelerometer 22) are such that an "out of bag" event is identified as specified above, the transition T2 is triggered and the computing device 10 enters state Sx.

During state Sx, the computing device 10 starts a timer and remains in state Sx for a threshold time-frame. Such time-frame may range from several seconds to some minutes, for example, up to 2 to 20 minutes, like 15 minutes, and may be a predefined threshold.

If the user interacts with the computing device during the time-frame, then the device 10 enters in state S0 (transition T3); otherwise the device 10 returns in state S1 (transition T4). The interaction between the user and the device 10, that triggers transition T3, may be freely chosen and may include one or more among: opening the lid 12 (identified through the lid status module 30), pressing a key, pressing a button, touching the screen in case of touch-screen device, etc.

In order to keep the computing device 10 in state s0 and in state S1, to avoid undesired transitions from state S0 to state S1 and vice versa, the following scenarios are also considered.

In particular, the device 10 is maintained in state S1 during the following scenarios (v)-(vii).

Scenario (v)—Device 10 is in the bag, stationary on a supporting element (for example, on the floor, on a chair, etc.).

When in state S1, the computing device 10 is in the low power state. Accordingly, the low power state should be maintained as long as a triggering event indicates that a transition to state S0 (through state Sx) is desired. Such event corresponds, as explained before, to a gesture of the user taking the device 10 out from the bag. Therefore, when in state S1, and in the absence of such triggering event, the device 10 remains in state S1 (exemplified in FIG. 3 with loop T5) until Scenario (iv) described above is identified by the gesture recognition module 38. The output of the other modules 30-36 is irrelevant in this scenario and therefore can be disregarded by the calculating unit 27.

Scenario (vi)—Device 10 is in the bag, and the user is walking/running to a destination.

The activity recognition module 32 detects that the device is moving (the user is moving, namely walking, with the device 10). At the same time, the computing device 10 is in state S1, therefore the computing device 10 is in the low power state. Accordingly, the low power state should be maintained until a triggering event indicates that a transition to state S0 (through state Sx) is desired. Such event may correspond, as explained before, to a gesture of the user taking the device 10 out from the bag. Therefore, when in state S1, and in the absence of such triggering event, the device 10 remains in state S1 (exemplified in FIG. 3 with loop T5) until Scenario (iv) described above is identified by the gesture recognition module 38. The output from the activity recognition module 32 (walking) can be used as a further proof that the device 10 is not currently in use and can be kept in the state S1 until Scenario (iv) is identified. The output of the other modules 30, 34, 36 is irrelevant in this scenario and therefore can be disregarded by the calculating unit 27. It is noted that Scenario (iv) foresees a passage to state Sx (and then S0) irrespective of the output of the activity recognition module 32; therefore, even if the activity recognition module 32 identifies a current activity (here, "walking"), passage to state Sx is anyway controlled as soon as the gesture recognition module 38 identifies an out-from-bag event.

Scenario (vii)—Device 10 is carried by a user who is driving to a destination (or equivalently is on a bus or other means of transport or vehicle).

The activity recognition module 32 detects that the device is moving (the user is moving on a means of transport with the device 10). At the same time, the computing device 10 is in state S1, therefore the computing device 10 is in the low power state. Accordingly, the low power state should be maintained until a triggering event indicates that a transition to state S0 (through state Sx) is desired. Such event may correspond, as explained before, to a gesture of the user taking the device 10 out from the bag. Therefore, when in state S1, and in the absence of such triggering event, the device 10 remains in state S1 (exemplified in FIG. 3 with loop T5) until Scenario (iv) described above is identified by the gesture recognition module 38. The output from the activity recognition module 32 (driving) can be used as a further proof that the device 10 is not currently in use and can be kept in the state S1 until Scenario (iv) is identified. The output of the other modules 30, 34, 36 is irrelevant in this scenario and therefore can be disregarded by the calculating unit 27. It is noted that Scenario (iv) foresees a passage to state Sx (and then S0) irrespective of the output of the activity recognition module 32; therefore, even if the activity recognition module 32 identifies a current activity (here, "driving"), passage to state Sx is anyway controlled as soon as the gesture recognition module 38 identifies an out-from-bag event.

The device 10 is maintained in state S0 during the following Scenarios (viii)-(x).

Scenario (viii)—Device 10 is placed on a desk and the lid is closed.

In this scenario, the computing device is in state S0. The flat-position detection module 36 detects that the computing device 10 is in a "flat" orientation, axis $z_1$ (or axis $z_2$) of accelerometer 20 (respectively, accelerometer 22) is parallel to the gravity vector g. In Scenario (viii) the lid is closed, therefore, as long as axis $z_1$ of accelerometer 20 is parallel to the gravity vector g, there is no need to further check whether the lid is open or closed to confirm the "flat" orientation. The activity recognition module 32 detects that the device is in a steady state (the user is not carrying or moving the device 10). Therefore, when in state S0, the device 10 remains in state S0 (exemplified in FIG. 3 with loop T6) until one of Scenarios (i)-(iii) described above is identified.

Scenario (ix)—Device 10 is held on user's lap, on an occasional table (e.g., of a train), or the like, with the lid open.

In this scenario, the computing device is in state S0. The lid status module 30 identifies that the lid 16 is open. Therefore, in this Scenario (ix), the device 10 is maintained in state S0 (exemplified in FIG. 3 with loop T6) until one of Scenarios (i)-(iii) described above is identified. The fact that the lid is open suffices to keep the device 10 in state S0, irrespective of the output of the remaining modules 32-36.

Scenario (x)—Device 10 is held on user's hand, who is walking to a destination with the lid open.

In this scenario, the computing device is in state S0. The lid status module 30 identifies that the lid 16 is open. Therefore, in this Scenario (x), the device 10 is maintained in state S0 (exemplified in FIG. 3 with loop T6) until one of Scenarios (i)-(iii) described above is identified. The fact that the lid is open suffices to keep the device 10 in state S0, irrespective of the output of the remaining modules 32-36.

In the above discussed Scenarios, the wording "parallel to" (e.g., when discussing axes of the accelerometers parallel to the gravity vector g) can be interpreted as "exactly parallel to" or, alternatively, "substantially parallel to," according to respective embodiments. With the latter interpretation, "substantially" means that if an angle between the axis and the vector exists, they are still considered parallel if such angle is below a threshold (e.g., of some tens of degrees, like 10°-40°, such as 30°).

The algorithms run by the calculating unit 27, implemented by the software modules 30-38, can be developed specifically for the present application, or can be chosen from those available in the state of the art, according to any specific need.

However, for the sake of completeness, the technology that can be used to implement such modules is discussed in the following.

Lid-Status Module 30

The status of the lid portion 16 (open or closed) can be obtained with a plurality of techniques.

For example, patent document EP3407157, filed in the name of the present applicant, relates to a computing system and to a method implemented by the computing system for fusing data originating from inertial sensors in order to calculate an existing angle between respective hardware elements of the computing system in a plurality of operating conditions of the computing system, more specifically with the aim of calculating an opening angle, or lid angle, that can be used to identify whether the lid is open or closed.

Other technologies are available, such as the use of Hall sensor and a magnet, electronic switches, mechanical or push switches, magnetic lid-closure sensors, etc.

Each of the above solutions can be used in the context of the present disclosure, as long as the respective sensor/system issues an output signal (e.g., lid open="0"; lid closed="1") that can be acquired and processed by the lid status module 30, to obtain the required information on the lid status.

Activity Recognition Module 32

Automatic recognition of user activity is already used in numerous context-aware applications and technologies.

Known in the art are sensor-based approaches, which require the use of sensors, such as accelerometers or gyroscopes, to capture user's movements and generate an output signal correlated to such movements. For purposes of automatically recognizing the activity of a user, a known approach is to collect and label a set of training data for each class of user activity that needs to be recognized and to match current activity sensor readings to readings expected for one of a plurality of pre-defined classes of targeted activities of interest. Such an approach requires training data for each of the activities desired to be recognized.

Moreover, deep neural network models may also be used and implemented for human activity recognition. They are capable of performing automatic feature learning from the raw sensor data and out-perform models fit on hand-crafted domain-specific features.

Statistical models (e.g., Markov models and/or the like) can also be used.

Activities that can be recognized include: steady state, walking state (it includes also jogging or running) and on-vehicle state (vehicles may include one or more among bus, train, car, bike).

On-Table Detection Module 34

This module implements a method to determine whether an electronic device is placed on a stable surface like a desk or table or is held on user's lap.

For example, module 34 can implement the method disclosed in patent document EP3358440, using accelerometer 20 and/or accelerometer 22 to generate an output signal in response to a vibration and/or orientation of device 10. According to this solution, feature detection circuits have inputs coupled to an output of the accelerometer, and are configured to determine a plurality of metrics indicative of characteristics of the output signal. A classifying circuit is configured to determine whether the device 10 is in contact with a human body based on the plurality of metrics. A first metric is indicative of the orientation of the device 10 and a second metric is indicative of the amount of activity performed on the device 10.

With reference to the first metric, when the device 10 is on a flat desk, the angle subtended between the base portion 14 of the device 10 and the horizontal plane XY of the reference system is substantially zero. The orientation or tilt of the electronic device 10 affects the accelerometer's output. For example, the data related to axis $x_2$ and the data related to axis $y_2$ are centered about 0 g when the device 10 is on a flat desk, since the angle subtended between the base portion 14 of the device 10 and the horizontal plane XY is substantially zero.

With reference to the second metric, it is noted that human bodies, on average, have a characteristic vibration in a range or frequency band typically from about 5 Hz to about 15 Hz. As such, when the device 10 is in contact with a human body, such characteristic vibration of the human body may be sensed by (at least one of) accelerometers 20, 22 and manifests itself in the accelerometer's output. For example, when the device 10 is placed on a user lap, the frequencies between 5 Hz and about 15 Hz have greater amplitudes in comparison to frequencies outside that frequency band. In comparison, when the electronic device 10 is placed on a desk and used for passive activity, the frequencies between 5 Hz and about 15 Hz have amplitudes that are similar to frequencies outside that frequency band. There may be sources of vibrations other than from the human body, examples being vibrations generated by typing performed on or using the device 10 or vibrations generated by a fan or a cooling mechanism included in the electronic device 10. Nonetheless, such additional vibrations can easily be filtered, since they tend to be localized in frequency. Furthermore, vibrations introduced by typing tend to be evenly spread in frequency, thereby manifesting as white noise, and can be easily filtered as well. It is therefore possible to identify whether the device 10 is placed on a desk or table or otherwise held on user's lap, and output a corresponding signal out from module 34.

The above is a mere exemplary possibility, and other methods can be used, to achieve the same or analogous purpose.

For example, further embodiment systems and methods that implement module 34 can extract a few (e.g., one or two) significant features from motion sensor data, and such extracted features can be orientation-independent. Stated differently, the features extracted from motion sensor data are not dependent on a coordinate system or a plurality of reference axes for accuracy. In particular, embodiment systems and methods rely on a mean-cross value and a variance of the norm of the motion sensor data within each acquisition time window, which features are orientation-independent. Furthermore, embodiment systems and methods can analyze the mean-cross value and the variance of the norm using a machine learning approach to determine whether or not the device 10 is located on a stationary or stable surface. Additionally, embodiment systems and methods can use physical sensor data without the need of complex processing methods (examples of such methods being sensor fusion for attitude estimation, calibration, FFT, and complex filtering chains).

Flat-Position Detection Module 36

This module identifies whether the device 10 is on a flat desk or other flat surface, specifically with the base portion 14 lying on such flat desk or other flat surface. This knowledge is useful to discriminate between other positions of the device 10, such as when device 10 is carried in a bag or a backpack.

When on a flat surface, the angle subtended between the base portion 14 of the device 10 and the horizontal plane XY of the reference system is substantially zero. The orientation or tilt of the electronic device 10 affects the accelerometer's output. For example, the data related to axis $x_2$ and the data related to axis $y_2$ are centered about 0 g when the device 10 is on a flat desk, since the angle subtended between the base portion 14 of the device 10 and the horizontal plane XY is substantially zero.

With reference to FIG. 1, considering the accelerometer 22, when device 10 is on a flat surface (parallel to plane XY), the detection axis $z_2$ is parallel to the gravity vector g (the respective signal is maximum, or above a threshold), and at the same time, the components of acceleration along the gravity vector g related to axes $x_2$, $y_2$ are almost zero (the respective signal is minimum, or below a threshold). Device 10 is in a "flat" orientation.

On the contrary, when device 10 is placed in a bag, one among axes $x_2$, $y_2$ may be parallel to the gravity vector g (the respective signal is maximum, or above a threshold). Device 10 is in a "not flat" orientation.

Based on the above, module 36 can output a signal indicative of the "flat"/"not flat" orientation of device 10.

It is noted that it is irrelevant whether the direction of axes $x_2$ and $y_2$ corresponds to the direction of the gravity vector, and the absolute values are therefore considered.

Furthermore, in order to isolate the components of acceleration due to gravity force, the data from axes $x_2$ and $y_2$ are low-pass filtered (e.g., with cut-off of 1 Hz), and the mean value of the low-pass filtered signal is used, for each axis, as the data to be compared with the above-mentioned threshold.

Figure 4:
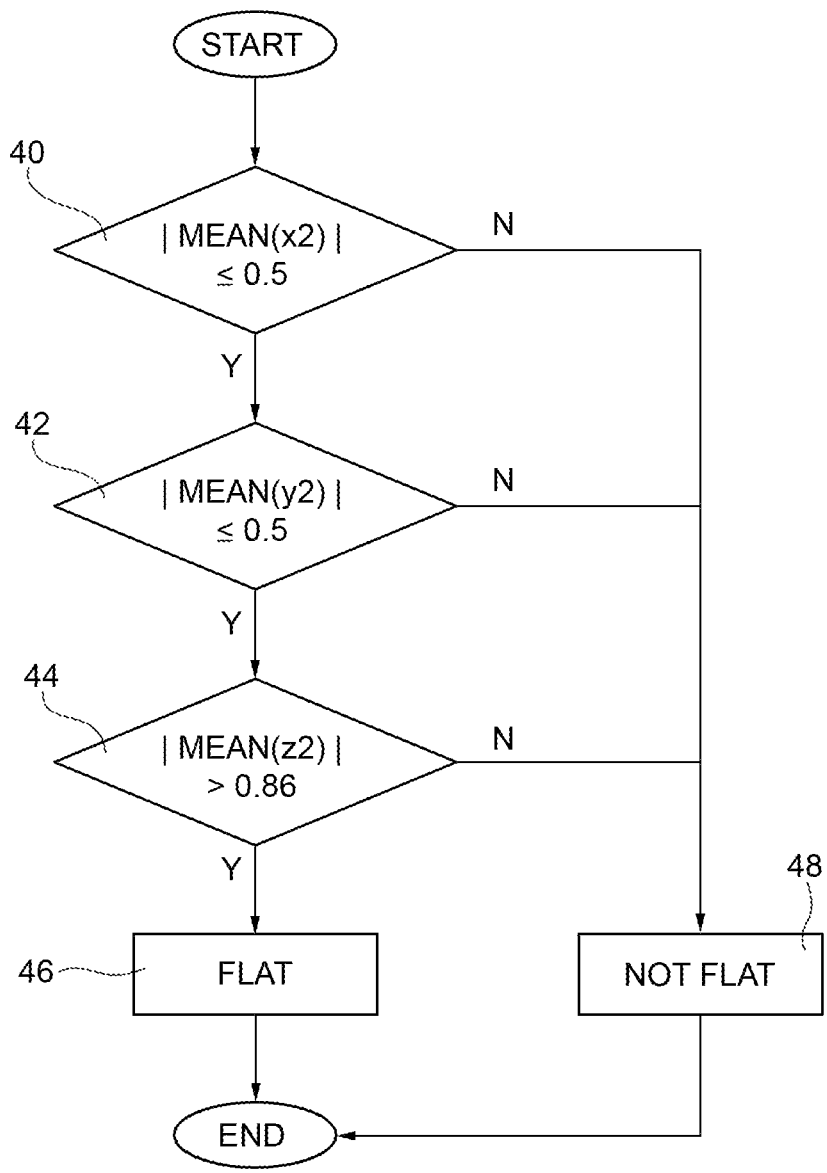
FIG. 4 is a flow chart showing an embodiment for recognising a flat or not-flat orientation of the electronic device of FIG. 1.

The procedure or algorithm implemented by module 36 in an embodiment, is reproduced hereunder with reference to the flow chart of FIG. 4.

In block 40, it is evaluated if the absolute mean value of $x_2$ is less than, or equal to, a threshold, e.g., 0.5.

In positive case (exit Y from block 40), it is evaluated, block 42, if the absolute mean value of $y_2$ is less than, or equal to, a threshold, e.g., 0.5.

If the evaluation in block 42 is positive (exit Y from block 42) then, block 44, it is evaluated if the mean value of $z_2$ is greater than a threshold, e.g., 0.86.

In positive case (exit Y from block 44), it is determined that the device 10 is in "flat" position or orientation (block 46).

If any one of evaluations at blocks 40-44 fails (exit N from anyone of block 40-44), then it is determined that the device 10 is in "not flat" position or orientation (block 48).

Threshold values 0.5 and 0.86 are merely exemplificative values, and can be freely chosen. In this exemplary embodiment, 0.5 means that an inclination of $x_2$ and $y_2$ axes (with respect to the gravity vector g) up to 30° is still considered "flat" (sin d(30)=0.5) and 0.86 means that an inclination of z axis (with respect to the gravity vector g) up to 30° is still considered "flat" (cos d(30)=0.86).

In general, the device may be considered "flat" for angles in the range 0-45 degrees.

Moreover, it is also noted that the output of module 36 may be used, according to the present disclosure, in Scenarios (i) and (viii). In both scenarios, the lid 12 is closed and therefore the orientation of axes $x_2$, $y_2$, $z_2$ of accelerometer 22 corresponds to the orientation of axes $x_1$, $y_1$, $z_1$ of accelerometer 20 (with the exception of the sign of the axis). Therefore, the output of module 36 can be accordingly modified based on data from accelerometer 20 or accelerometer 22, or both.

Gesture Recognition Module 38

In response to the output "flat"/"not flat" from module 36, an interrupt signal is generated. By recursively checking a variation of the interrupt signal, calculation unit 27 can identify a variation of the inclination or positioning of the device 10, which may correspond to the event or condition triggering a passage from state S1 to state S0 through state Sx (transition T2), or from state S0 to state S1 (transition T1). The two gestures of removing the computing device 10 from a flat surface to insert the device 10 in the bag, and of taking the computing device 10 out from the bag and placing the device 10 on a flat support, can thus be recognized to move the device 10 in the low power state S1 and to the working state S0, respectively.

A further embodiment of the present disclosure distinguishes between a scenario when the device 10 is actually carried in a bag or is instead carried by the user with a position or orientation that replicates the position of the device 10 in the bag, without actually being in the bag (e.g., device 10 is carried under the user's arm with the lid closed). In particular, there might be that case where the user has to move from one location to another and carries the device 10 by hands for ease of transportation, without necessarily putting the device in the bag.

In order to cope with this further scenario, the calculating unit 27 can implement the handheld module 39, configured to sense whether the device 10 is actually in a bag or is carried hand-held, e.g., under the user's arm or kept/hold by a hand, or held at the user's chest.

Figure 5:
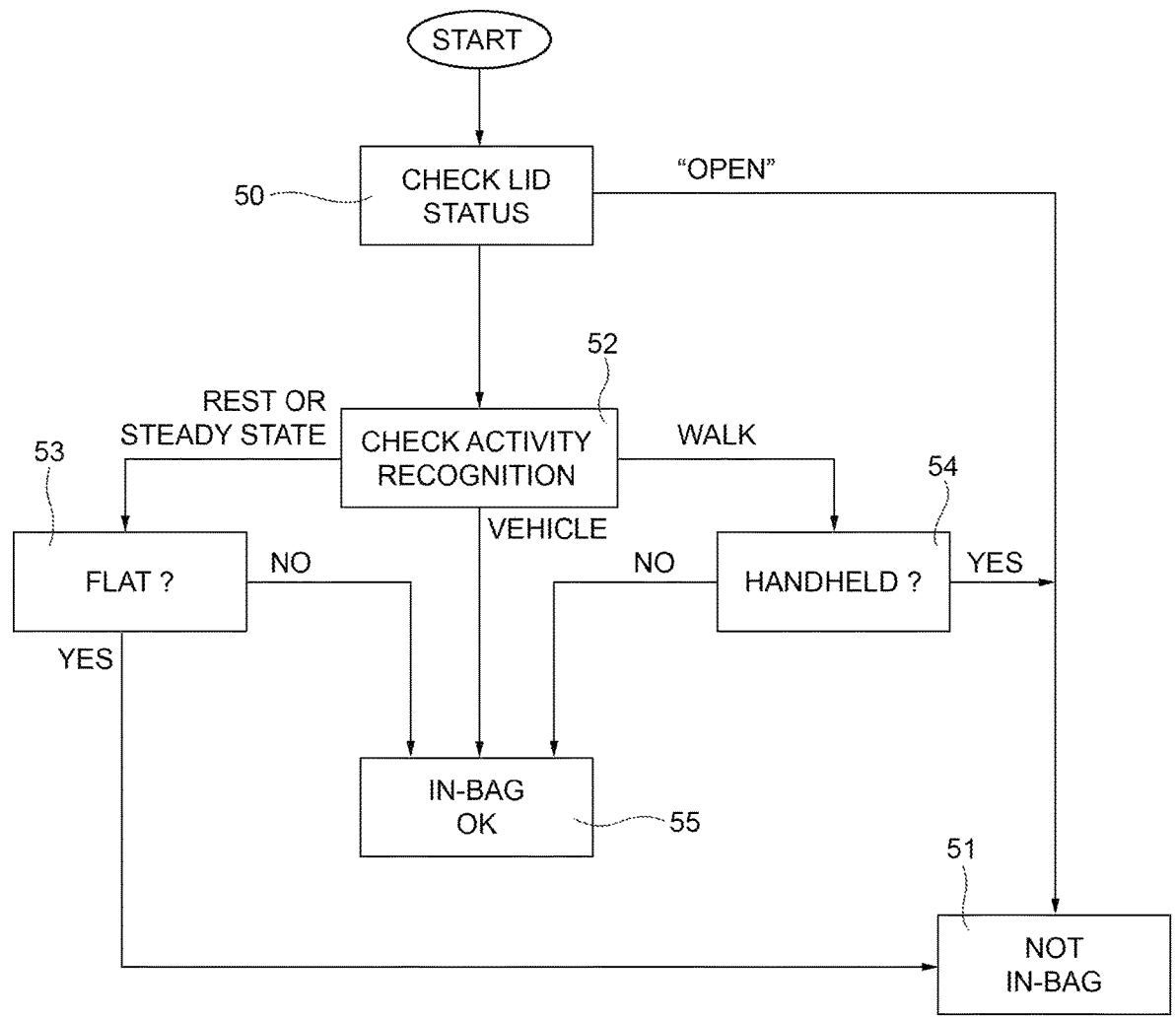
FIG. 5 is a flow chart showing a method that can be used to detect whether the electronic device of FIG. 1 is hand-held or carried in a bag.

FIG. 5 shows a block diagram exemplifying steps that are carried out by the calculating unit 27 to evaluate whether the device 10 is in a bag or hold otherwise.

In FIG. 5, step 50, the lid state is checked by the lid status module 30. If the lid state is "open" then, step 51, the device 10 is considered not to be in the bag, nor hand-held.

If the output from step 50 is such that the lid state is "closed" then, step 52, the actual activity performed by the user holding the device 10 is checked by the activity recognition module 32.

If, output from step 52, the device 10 is in a rest or steady state, then step 53 is carried out, to check whether the device 10 is in a flat position. This step is carried out by the flat-position detection module 36, which detects whether the device 10 is in a "flat" or "not-flat" orientation as discussed above. In case of device 10 in flat position, step 51 is carried out, where the device 10 is deemed not to be in a bag. Otherwise, step 55, the device 10 is considered to actually be in a bag.

If, output from step 52, the device 10 is carried by a user who is driving to a destination or is on a transport means or vehicle then, step 55, the device 10 is considered to actually be in a bag.

If, output from step 52, the activity recognition module 32 detects that the user carrying or transporting the device 10 is walking then, step 54 of checking if the device 10 is hand-held is performed. If the device 10 is deemed to be hand-held, then step 51 is performed and the device 10 is considered not to be in a bag. On the contrary, step 55 is performed and the device 10 is considered to actually be in a bag. It is noted that one or more of the following situations can be checked to verify if the device 10 is actually hand-held:
- the user is walking or running with device 10 hand-held laterally (e.g., under the arm) in a vertical position (with axes $x_1$ and $x_2$ along the gravity vector g);
- the user is walking or running with device 10 hand-held laterally (e.g., under the arm) in an horizontal position (with axes $y_1$ and $y_2$ along to the gravity vector g);
- the user is walking or running with device 10 at his/her chest (with axes $x_1$ and $x_2$ or $y_1$ and $y_2$ along the gravity vector g).

The above three situations, indicative of a device 10 that is hand-held, can also be verified using, in addition or as an alternative to axes $x_1$, $y_1$, $z_1$, $x_2$, $y_2$, $z_2$, the correspondingly parallel detection axes $l_1$, $m_1$, $n_1$, $l_2$, $m_2$, $n_2$.

When the device 10 is in a bag according to step 55, actions can be carried out as detailed above, e.g., the device 10 is moved or kept in the low power state S1 (which may include, but not limited to, a stand-by or a hibernate state).

When the device 10 is not in a bag according to step 51, then the device 10 may be maintained in a working state S0 or in the intermediate state Sx (or, generally, in a working state where some energy-saving strategies are implemented), at least for a threshold period of time.

The decision whether or not the device 10 is in the bag can be summarized with the following expression:

In-bag=((steady AND no-flat) OR (walking AND no-handheld) OR in-vehicle) AND lid_closed In order to further improve the correctness of the in-bag check according to step 55, an optional "stability timer" can be implemented. In particular, the stability timer sets a time frame during which the "in bag" decision under step 55 is maintained unaltered. Such time frame is, for example, between 20 and 60 seconds. During said time frame, an event may take place that is indicative that the user is using the device (e.g., the lid is opened), or indicative that the device is set on a table or other flat position during a rest or steady state, or any other event that alters the output of the previous expression for in-bag checking (e.g., recognition by module 32 of a specific activity that is incompatible with the "in-bag" situation). In such a case, different strategies may be considered; for example, the steps of FIG. 5 are carried out again; or the stability timer is reset waiting for a further event indicative of a "in-bag" situation and keeping the device 10 in the previous state; etc.

The step 54 of verifying whether the device 10 is hand-held can be implemented by various means, for example, through a machine-learning approach. A non-limiting embodiment using a machine-learning approach is detailed in the following, in particular using machine learning core features available in the inertial module known as iNEMO™ (in its various versions, referred to with the codes LSM6DSOX, LSM6DSRX, ISM330DHCX) and manufactured by the present Applicant. Inertial modules are inertial measurement units (IMU) which integrate complementary types of sensors to offer compact, robust, and easy-to-assemble solutions compared to discrete MEMS products. The iNEMO™ System-in-packages (SiP) combine accelerometer, gyroscope and magnetometer in a monolithic 6-axis or 9-axis solution. To further save power at system level, the inertial module comes with an embedded Machine Learning Core (MLC).

Figure 6:
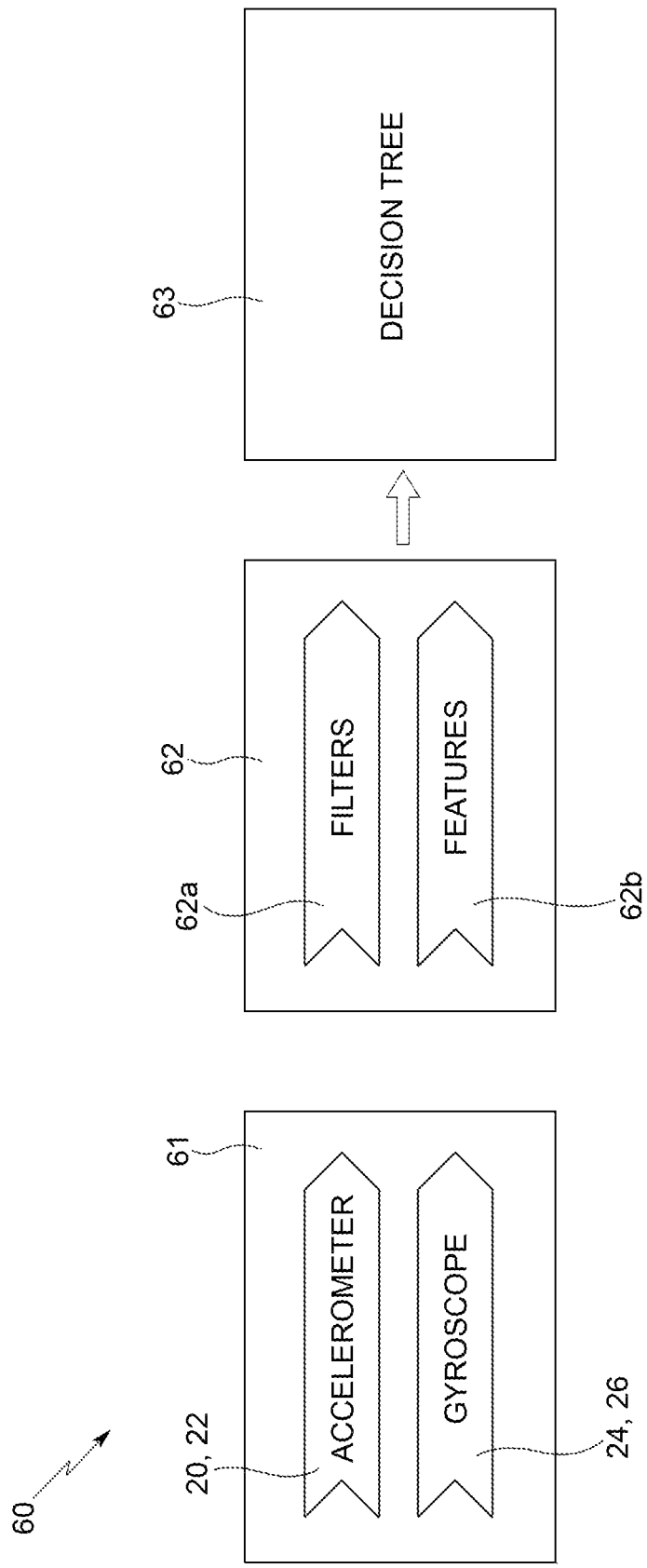
FIG. 6 shows a block diagram of a Machine Learning Core, used to detect whether the electronic device of FIG. 1 is hand-held, to implement part of the flow chart of FIG. 5.

FIG. 6 shows a non-limiting example of a Machine Learning Core 60. The Machine Learning Core 60 can be schematized by three main blocks: Sensor data block 61, Computation block 62, Decision tree block 63.

The MLC 60 runs an in-sensor classification engine, offloading the main processor to either run different tasks or to be put to sleep and save power, while the built-in sensors identify motion data. The integration of multiple sensor outputs may bring motion sensing systems to the level of accuracy required for the most demanding applications, such as enhanced gesture recognition, gaming, augmented reality, indoor navigation and localization-based services. The Machine Learning processing capability allows moving some algorithms from the application processor to the MEMS sensor, enabling consistent reduction of power consumption. The Machine Learning processing capability is obtained through a decision-tree logic. A decision tree is known to be a mathematical tool formed by a series of configurable nodes. Each node is characterized by an "if-then-else" condition, where an input signal (represented by statistical parameters calculated from the sensor data) is evaluated against a threshold. The MLC 60 can be configured to run one decision tree or a plurality (e.g., up to eight) decision trees simultaneously and independently. The decision trees may be stored in the device and generate results in the dedicated output registers. The results of the decision tree can be read from the application processor at any time. Furthermore, there is the possibility to generate an interrupt for every change in the result in the decision tree.

The type of algorithms suitable for the Machine Learning Core are those which can be implemented through a so-called inductive approach, which involves searching patterns from observations. For example, both the activity recognition module 32 and the handheld module 39 may follow this approach.

The Sensor data block 61 is composed of data coming from the accelerometers 20/22 and gyroscopes 24/26 (integrated in the device 10), and/or from additional external sensor(s) which might be connected through an interface (not shown). The Machine Learning Core inputs acquired in the Sensor data block 61 are used in the Computation block 62, where filters may be applied and features may be computed. The features are statistical parameters computed from the input data (or from the filtered data) in a defined time window, selectable by the designer.

The Machine Learning Core 60 uses the data from accelerometers and gyroscopes (as well as optional external sensor data) to compute in block 62 a set of statistical parameters selectable by the designer (such as mean, variance, energy, peak, zero crossing, etc.) in a defined time window. In addition to the sensor input data, further inputs can be defined by applying configurable filters 62a. The Machine Learning Core parameters 62b are herein called "features" and can be used as input for the configurable decision tree (e.g., a binary tree formed by a series of nodes). In each node of the decision tree of block 63, statistical parameters (the features) are evaluated against a respective threshold to establish the evolution in the next node. When a leaf (one of the last nodes of the tree) is reached, the decision tree generates a result which is readable through a dedicated device register.

In order to implement the machine learning processing capability, a "supervised learning" approach may be used, which includes: identifying classes to be recognized; collecting multiple data logs for each class; performing data analysis from the collected logs to learn a generic rule which allows mapping inputs (data logs) to outputs (classes to be recognized).

In an activity recognition algorithm, for instance, the classes to be recognized might be: stationary, walking, jogging, biking, driving, etc.

In a hand-held recognition algorithm, for instance, the classes to be recognized might be: walking with device 10 hand-held laterally and in vertical orientation, walking with device 10 hand-held laterally and in horizontal orientation, walking with device 10 at chest.

Multiple data logs are acquired for every class, e.g., by collecting logs in real-life conditions by asking to a multiplicity of persons to perform the same activity.

The analysis on the collected data logs has the purpose of defining the features to be used to correctly classify the different classes, defining the filters to be applied to the input data to improve the performance using the selected features, generating a dedicated decision tree able to recognize one of the different classes (mapping inputs to outputs).

The features computed in the Computation block 62 will be used as input for the Decision tree block 63, which includes the binary tree which evaluates the statistical parameters computed from the input data. In the binary tree the statistical parameters are compared against thresholds to generate results (in the example of the activity recognition described above, the results might be the type of activity among: stationary, walking, jogging, biking, etc.; in the hand-held recognition described above, the results might be: walking with device 10 hand-held in lateral vertical position, walking with device 10 hand-held in lateral horizontal position, walking with device 10 hand-held at chest).

The results of the decision tree might also be filtered by an optional filter called "meta-classifier." The Machine Learning Core results will be the results of the decision tree, including the optional meta-classifier.

Inputs

The accelerometers and gyroscopes generate acceleration and angular rate output data. The 3-axis data of the acceleration and angular rate can be seen as input for the Machine Learning Core 60. The rate of the input data is may be, for example, equal to, or higher than, the Machine Learning Core data rate, which might be configurable.

For example, in the hand-held recognition algorithm, the Machine Learning Core processing rate (data rate) can be set at 52 Hz, and the sensors are configured to operate at a frequency rate equal to or higher than 52 Hz.

Filters

The input data previously discussed can be filtered, for example, by a second order IIR (Infinite Impulse Response) filter.

A first bandpass filter may be implemented as a second order IIR Butterworth filter on squared accelerometer norm data, with cutoff frequency at 1-3 Hz.

A second bandpass filter may be implemented as a second order IIR Butterworth on gyroscope x-axis data, with cutoff frequency at 7-9 Hz.

Figure 7:
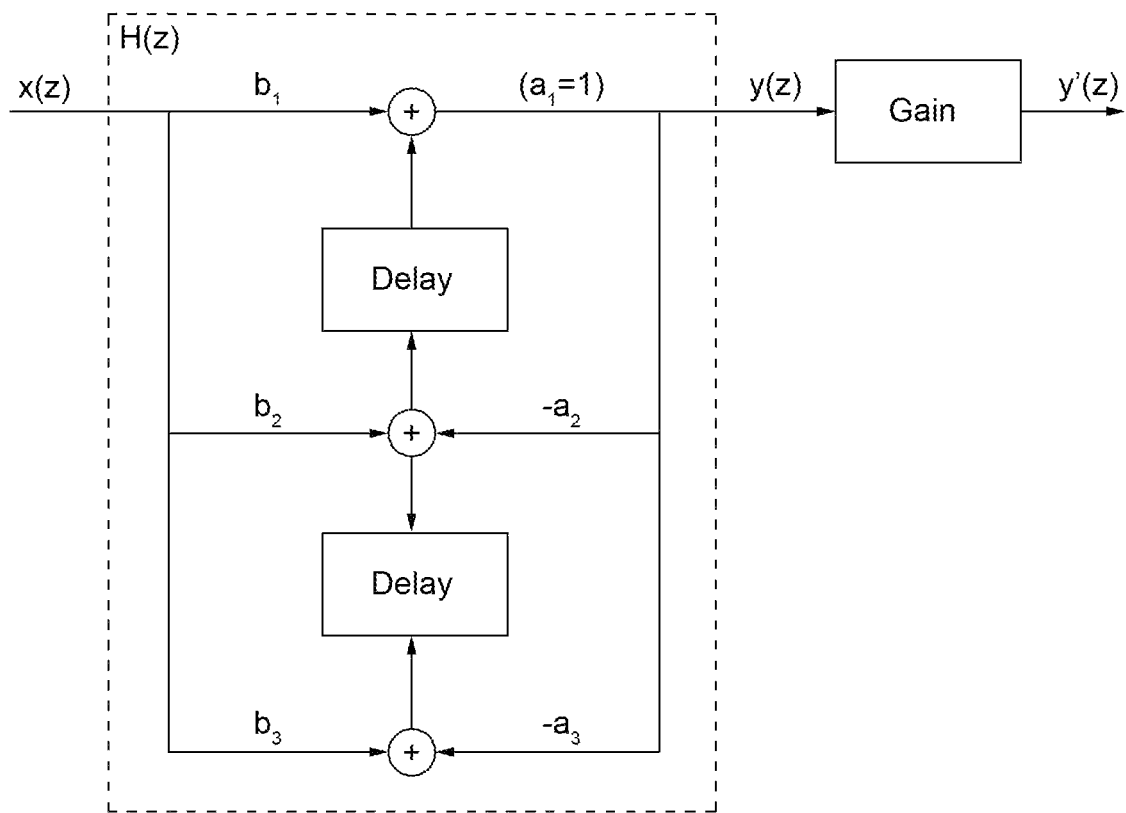
FIG. 7 is a schematic representation of a IIR filter, to be used by the Machine Learning Core of FIG. 6.

With reference to FIG. 7, the transfer function of the generic IIR 2nd order filter that can be used in this context is the following:

$$H(z) = \frac{b_1 + b_2 z^{-1} + b_3 z^{-2}}{1 + a_2 z^{-1} + a_3 z^{-2}}$$

The filters outputs can therefore be defined as:

$$y(z) = H(z) \cdot x(z)$$

$$y'(z) = y(z) \cdot \text{Gain}$$

Different kinds of filters may be used (high-pass, band-pass, 1st order IIR, 2nd order IIR), according to the needs; the filter coefficients are configurable accordingly. The IIR filter coefficients can be computed with different tools, including Matlab, Octave and Python, in a way that is apparent to the skilled person.

Features

The "features" are the statistical parameters computed from the Machine Learning Core inputs. The Machine Learning Core inputs which can be used for features computation are:

the inertial sensors (accelerometer/gyroscope) input data which includes sensor data from the x, y, z axes of the accelerometer (and equivalent l, m, n axes of the gyroscope); and norm and squared norm signals of the inertial sensor;

the filtered data (using the above detailed filters).

All the features may be computed within a defined time window (e.g., few seconds, such as 2.5 seconds), which is also called "window length" since it is expressed as the number of samples (e.g., from 1 to 255 samples). The size WL of the window can be determined by the designer. All the statistical parameters in the decision tree may be evaluated within this time window. In an embodiment, it is not a moving window, features are computed just once for every WL sample.

The choice of the window length value depends on the sensor data rate, which introduces a latency for the generation of the Machine Learning Core result, and on the specific application or algorithm.

The following table shows features available in the Machine Learning Core including additional parameters, if applicable:

| Feature | Additional parameter |
| --- | --- |
| MEAN | — |
| VARIANCE | — |
| ENERGY | — |
| PEAK TO PEAK | — |
| ZERO CROSSING | Threshold |
| POSITIVE ZERO CROSSING | Threshold |
| NEGATIVE ZERO CROSSING | Threshold |
| PEAK DETECTOR | Threshold |
| POSITIVE PEAK DETECTOR | Threshold |
| NEGATIVE PEAK DETECTOR | Threshold |
| MINIMUM | — |
| MAXIMUM | — |

The feature "Mean" computes the average of the selected input (I) in the defined time window (WL).

The feature "Variance" computes the variance of the selected input (I) in the defined time window (WL).

The feature "Energy" computes the energy of the selected input (I) in the defined time window (WL).

The feature "Peak to peak" computes the peak-to-peak value of the selected input in the defined time window (WL).

The feature "Zero-crossing" computes the number of times the selected input crosses a certain threshold. This internal threshold may be defined as the sum between the average value computed in the previous window (feature "Mean") and hysteresis defined, for example, by the designer.

The feature "Positive zero-crossing" computes the number of times the selected input crosses a certain threshold. This internal threshold may be defined as the sum between the average value computed in the previous window (feature "Mean") and hysteresis defined, for example, by the designer. Only the transitions with positive slopes are considered for this feature.

The feature "Negative zero-crossing" computes the number of times the selected input crosses a certain threshold. This internal threshold may be defined as the sum between the average value computed in the previous window (feature "Mean") and hysteresis defined, for example, by the designer. Only the transitions with negative slopes are considered for this feature.

The feature "Peak detector" counts the number of peaks (positive and negative) of the selected input in the defined time window. A threshold may be defined, for example, by the designer for this feature, and a buffer of three values may be considered for the evaluation. If the second value of the three values buffer is higher (or lower) than the other two values of a selected threshold, the number of peaks is increased. The buffer of three values considered for the computation of this feature may be a moving buffer inside the time window.

The feature "Positive peak detector" counts the number of positive peaks of the selected input in the defined time window. A threshold may be defined, for example, by the designer for this feature, and a buffer of three values may be considered for the evaluation. If the second value of the three values buffer is higher than the other two values of a selected threshold, the number of peaks is increased. The buffer of three values considered for the computation of this feature may be a moving buffer inside the time window.

The feature "Negative peak detector" counts the number of negative peaks of the selected input in the defined time window. A threshold may be defined, for example, by the designer for this feature, and a buffer of three values may be considered for the evaluation. If the second value of the three values buffer is lower than the other two values of a selected threshold, the number of peaks is increased. The buffer of three values considered for the computation of this feature may be a moving buffer inside the time window.

The feature "Minimum" computes the minimum value of the selected input in the defined time window.

The feature "Maximum" computes the maximum value of the selected input in the defined time window.

The following is a detailed list of available features:

F1_ABS_MEAN_on_ACC_X: absolute value of average of x-axis of accelerometer data over defined window.

F2_ABS_MEAN_on_ACC_Y: absolute value of average of y-axis of accelerometer data over defined window.

F3_MEAN_on_ACC_Z: average of z-axis of accelerometer data over defined window.

F4_VAR_on_ACC_X: variance of x-axis of accelerometer data over defined window.

F5_VAR_on_ACC_Y: variance of y-axis of accelerometer data over defined window.

F6_VAR_on_ACC_V2: variance of the squared norm of accelerometer data over defined window.

F7_VAR_on_GY_X: variance of l-axis of gyroscope data over defined window.

F8_VAR_on_GY_Y: variance of m-axis of gyroscope data over defined window.

F9_VAR_on_GY_Z: variance of n-axis of gyroscope data over defined window.

F10_VAR_on_filter_BP_on_GYRO_X: variance of l-axis of gyroscope data (after application of bandpass filter) over defined window.

ENERGY_on_ACC_V2: energy of the squared norm of accelerometer data over defined window.

F12_ENERGY_on_filter_BP_on_ACC_V2: energy of the squared norm of accelerometer data (after application of bandpass filter) over defined window.

F13_PeakToPeak_on_ACC_V: peak-to-peak (max minus min) of the norm of accelerometer data over defined window.

F14_PeakToPeak_on_GY_X: peak-to-peak (max minus min) of l-axis of gyroscope data over defined window.

F15_PeakToPeak_on_GY_Z: peak-to-peak (max minus min) of n-axis of gyroscope data over defined window.

F16_PeakToPeak_on_GY_V: peak-to-peak (max minus min) of the norm of gyroscope data over defined window.

F17_PeakToPeak_on_filter_BP_on_ACC_V2: peak-to-peak (max minus min) of the squared norm of accelerometer data (after application of bandpass filter) over defined window.

F18_PeakToPeak_on_filter_BP_on_GYRO_X: peak-to-peak (max minus min) of l-axis of gyroscope data (after application of bandpass filter) over defined window.

F19_ZeroCross_on_ACC_X: number of zero crosses of x-axis of accelerometer data over defined window.

F20_ZeroCross_on_ACC_Z: number of zero crosses of z-axis of accelerometer data over defined window.

F21_ZeroCross_on_ACC_V: number of zero crosses of the norm of accelerometer data over defined window.

F22_ZeroCross_on_GY_Y: number of zero crosses of m-axis of gyroscope data over defined window.

F23_ZeroCross_on_GY_V: number of zero crosses of the norm of gyroscope data over defined window.

F24_PeaKDet_on_ACC_X: number of peaks of x-axis of accelerometer data over defined window.

F25_PeaKDet_on_ACC_Y: number of peaks of y-axis of accelerometer data over defined window.

F26_PeaKDet_on_GY_Y: number of peaks of m-axis of gyroscope data over defined window.

F27_PeaKDet_on_filter_BP_on_ACC_V2: number of peaks of the squared norm of accelerometer data (after application of bandpass filter) over defined window.

F28_MIN_on_ACC_X: minimum value of x-axis of accelerometer data over defined window.

F29_MIN_on_filter_BP_on_ACC_V2: minimum value of the squared norm of accelerometer data (after application of bandpass filter) over defined window.

F30_MAX_on_ACC_X: maximum value of x-axis of accelerometer data over defined window.

F31_MAX_on_filter_BP_on_ACC_V2: maximum value of the squared norm of accelerometer data (after application of bandpass filter) over defined window.

The following is a detailed example list of features that can be selected in the hand-held recognition, to evaluate whether the device 10 is hand-held at step 54 of FIG. 5:

F1_ABS_MEAN_on_ACC_X
F2_ABS_MEAN_on_ACC_Y
F4_VAR_on_ACC_X
F5_VAR_on_ACC_Y
F6_VAR_on_ACC_V2

F7_VAR_on_GY_X
F8_VAR_on_GY_Y
F9_VAR_on_GY_Z
F10_VAR_on_filter_BP_on_GYRO_X
F11_ENERGY_on_ACC_V2
F12_ENERGY_on_filter_BP_on_ACC_V2
F13_PeakToPeak_on_ACC_V
F14_PeakToPeak_on_GY_X
F15_PeakToPeak_on_GY_Z
F16_PeakToPeak_on_GY_V
F17_PeakToPeak_on_filter_BP_on_ACC_V2
F22_ZeroCross_on_GY_Y
F23_ZeroCross_on_GY_V
F24_PeaKDet_on_ACC_X
F25_PeaKDet_on_ACC_Y
F26_PeaKDet_on_GY_Y
F28_MIN_on_ACC_X
F30_MAX_on_ACC_X The following is a detailed example list of features that can be selected in the activity recognition, to evaluate which activity the user of the device 10 is performing:
F6_VAR_on_ACC_V2
F11_ENERGY_on_ACC_V2
F12_ENERGY_on_filter_BP_on_ACC_V2
F13_PeakToPeak_on_ACC_V
F16_PeakToPeak_on_GY_V
F17_PeakToPeak_on_filter_BP_on_ACC_V2
F27_PeaKDet_on_filter_BP_on_ACC_V2
F29_MIN_on_filter_BP_on_ACC_V2
F31_MAX_on_filter_BP_on_ACC_V2

The following is a detailed example list of features that can be selected in the flat/not-flat recognition, to evaluate if the device 10 is on a flat surface:
F1_ABS_MEAN_on_ACC_X
F3_MEAN_on_ACC_Z The following is a detailed example list of features that can be selected in the on-table or steady state detection:
F4_VAR_on_ACC_X
F5_VAR_on_ACC_Y
F6_VAR_on_ACC_V2
F7_VAR_on_GY_X
F8_VAR_on_GY_Y
F9_VAR_on_GY_Z
F10_VAR_on_filter_BP_on_GYRO_X
F11_ENERGY_on_ACC_V2
F12_ENERGY_on_filter_BP_on_ACC_V2
F13_PeakToPeak_on_ACC_V
F14_PeakToPeak_on_GY_X
F15_PeakToPeak_on_GY_Z
F16_PeakToPeak_on_GY_V
F17_PeakToPeak_on_filter_BP_on_ACC_V2
F18_PeakToPeak_on_filter_BP_on_GYRO_X
F19_ZeroCross_on_ACC_X
F20_ZeroCross_on_ACC_Z
F21_ZeroCross_on_ACC_V
F22_ZeroCross_on_GY_Y
F23_ZeroCross_on_GY_V
F24_PeaKDet_on_ACC_X
F25_PeaKDet_on_ACC_Y
F26_PeaKDet_on_GY_Y
F27_PeaKDet_on_filter_BP_on_ACC_V2
F29_MIN_on_filter_BP_on_ACC_V2
F31_MAX_on_filter_BP_on_ACC_V2

Decision Tree

The decision tree is the predictive model built from the training data. Decision trees are per se known in the art, and readily available to the skilled person. The training data are the data logs acquired for each class to be recognized. The outputs of the computation blocks described previously are the inputs of the decision tree. Each node of the decision tree contains a condition, where a feature is evaluated with a certain threshold. If the condition is true, the next node in the true path is evaluated. If the condition is false, the next node in the false path is evaluated. The status of the decision tree will evolve node by node until a result is found. The result of the decision tree is one of the classes defined at the beginning of the data collection. The decision tree generates a new result every time window (the parameter "window length" set by the designer for the computation of the features). The Machine Learning Core results (decision tree results, optionally filtered by the meta-classifier) are accessible through dedicated registers. These registers can be continuously read (e.g., polled, possibly periodically) to check the decision tree outputs.

Figure 8C:
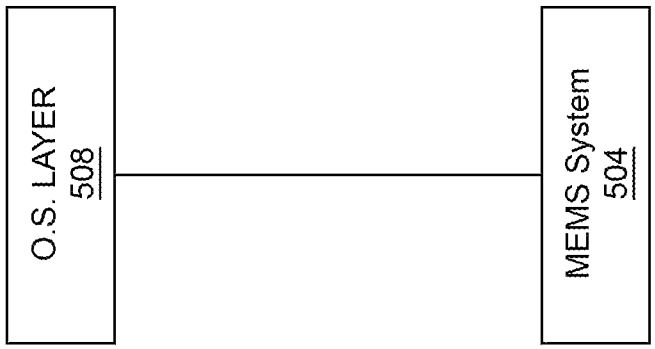
FIGS. 8A-8C show block diagrams illustrating various ways of implementing the modules or circuits of FIG. 2.

The embodiment systems and methods discussed above can be implemented in various ways. FIG. 8A shows a first example, where the calculating unit 27 (e.g., a microcontroller) is part of a System on Chip (SoC) 506, and the operations of modules 30-39 are implemented by the calculating unit 27. The calculating unit 27 is coupled to a micro-electro-mechanical (MEMS) system-in-package 504, which includes accelerometers 20 and 22, and gyroscopes 24 and 26 (when present, according to the previously described embodiments). Furthermore, the SoC 506 is communicatively coupled to the operating system layer 508 of the device 10.

Figure 8B:
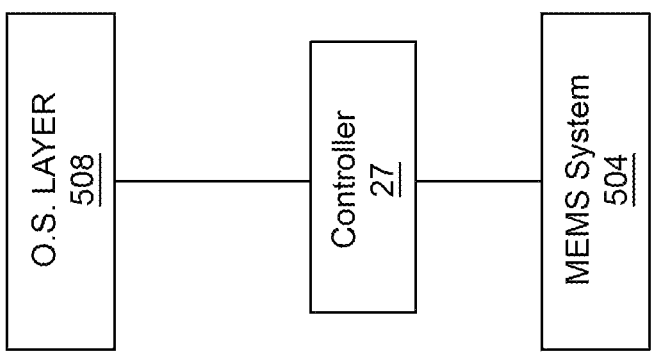
Figure 8A:
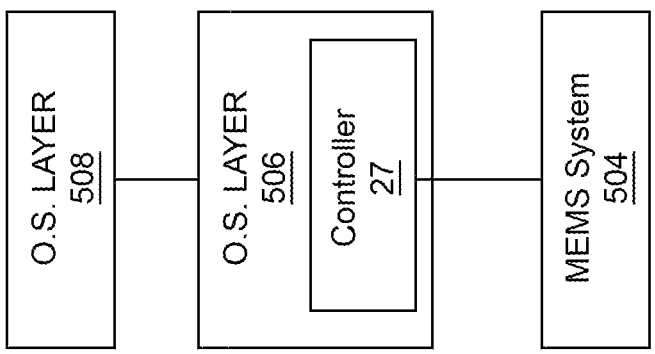

FIG. 8B shows another example, where the operations of modules 30-39 are implemented by directly connecting the calculating unit 27 to the operating system layer 508 (e.g., without the SoC 506 of FIG. 5A being an intervening connection).

FIG. 8C shows another example, where the operations of modules 30-39 are implemented directly in hardware (e.g., directly on the MEMS system-in-package 504, aided by software embedded in the MEMS system-in-package 504) that is connected to the operating system layer 508. It is noted that current consumption of the implementation shown in FIG. 8A is greater than current consumption of the implementation shown in FIG. 8B, which is, in turn, greater than current consumption of the implementation shown in FIG. 8C.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

From what has been described above, the potential advantages of various embodiments of the present disclosure emerge clearly.

In particular, the present disclosure allows to switch the device 10 into a dedicated low-power state in order to optimize the battery usage and increment the battery life whenever is sensed that the user is putting his/her device 10 into a bag for transporting the device 10 to another location, and restore the working (full-power) state whenever is sensed that the user is taking the device 10 out from the bag, to use it thereby rendering the device 10 more likely to be immediately operative when required by the user. User experience is therefore considerably enhanced.

Moreover, by putting the device 10 in the low-power state when in bag, overheating of device 10 is minimized.

The possibility of recognizing a device 10 that is handheld in a position which resembles that of a device carried in a bag further enhances user's experience since, in this context, the device 10 can be kept in its working state or in a state from which the working state can be rapidly recovered.

Finally, it is clear that modifications and variations may be made to what has been described and illustrated herein, without thereby departing from the scope of the present disclosure.

For example, the operation discussed above, to implement the states transition of FIG. 3, can be analogously carried out using the data from the gyroscope 24 and/or the gyroscope 26.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, based on sensor data, information indicative of movement of an electronic device, the information including information indicative of a change of inclination of the electronic device with respect to one or more planes orthogonal to a gravity vector acting on the electronic device, information indicative of a position of the electronic device on one or more of the one or more planes orthogonal to the gravity vector, and information indicative of a type of user-activity associated with the electronic device; and
managing transitions of the electronic device between a plurality of different power states, the plurality of different power states including a working-power state, an intermediate-power state and a low-power state, wherein the managing transitions includes:
managing transitions to the low-power state based on one or more of the information indicative of an inclination change or the information indicative of a type of user-activity;
managing transitions from the low-power state to the intermediate-power state based on the information indicative of a position of the electronic device; and
managing transitions from the intermediate-power state to the working-power state based on an indication of user interaction with the electronic device, wherein
the electronic device has a base portion and a lid portion, and the generating the information indicative of a change in inclination comprises:
detecting a change in an angle between a plane of the base portion and a plane of the lid portion;
in response to the detecting of the change in the angle, comparing the angle to a threshold angle; and
generating the information indicative of the change in inclination based on the comparison.

2. The method of claim 1, comprising:
responding to an indication of a change of inclination by transitioning the electronic device to the low-power state.

3. The method of claim 1, comprising:
in response to the electronic device operating in the intermediate-power state,
starting a timer;
in response to receiving an indication of user interaction with the electronic device before expiration of the timer, transitioning from the intermediate-power state to the working-power state; and
in response to expiration of the timer without receiving an indication of user interaction with the electronic device, transitioning from the intermediate-power state to the low-power state.

4. The method of claim 1, comprising:
in response to the electronic device operating in the working-power state or the intermediate-power state, responding to an indication of a type of user-activity of walking by selectively transitioning to the low-power state based on the information indicative of a change of inclination.

5. The method of claim 1, comprising:
in response to the electronic device operating in the working-power state or the intermediate-power state, responding to an indication of a type of user-activity of traveling in a vehicle by selectively transitioning to the low-power state based on the information indicative of a change of inclination.

6. The method of claim 1, comprising:
generating at least some of the sensor data using an inertial sensor of a triaxial type having a first detection axis, a second detection axis, and a third detection axis, the sensor data including acceleration values along said first, second, and third detection axes; and
in response to the information indicative of a type of user-activity indicating a steady-state user-activity:
  acquiring respective acceleration values along the first, second and third detection axes;
  identifying a flat orientation of said electronic device when the respective acceleration values along the second and third detection axes are negligible with respect to the acceleration value along the first detection axis; and
  transitioning to the working-power state in response to identifying the flat orientation.

7. The method of claim 6, comprising:
identify a not-flat orientation of said electronic device when the value along the first detection axis is negligible with respect to at least one of the respective values along the second and the third detection axes; and
transitioning the electronic device to the low-power state if the lid portion is closed, the not-flat orientation is identified and the information indicative of a type of user-activity indicates a steady-state user-activity.

8. The method of claim 6, comprising:
comparing the values along the first, second and third detection axes with respective detection thresholds; and
determining that the respective value along a detection axis is negligible when the respective value is below the respective detection threshold.

9. The method according to claim 8, wherein said detection thresholds correspond to respective angles, formed by the first, second and third detection axes with the gravity vector, having respective values in the range 0-45 degrees.

10. The method of claim 1, comprising:
detecting a relative orientation of the base portion with respect to the lid portion;
comparing the relative orientation with a threshold relative orientation to determine whether the lid is closed; and
in response to the comparing indicating the lid is closed and the information indicative of a type of user-activity indicating one of walking, running, jogging or moving on a vehicle, transitioning the electronic device to the low-power state.

11. The method of claim 1, comprising:
detecting a relative orientation of the base portion with respect to the lid portion;
comparing the relative orientation with a threshold relative orientation to determine whether the lid is closed; and
in response to the comparing indicating the lid is open, operating the electronic device in the working-power state.

12. The method of claim 1, comprising:
detecting a relative orientation of the base portion with respect to the lid portion;
comparing the relative orientation with a threshold relative orientation to determine whether the lid is closed; and
in response to the comparing indicating the lid is closed and the information indicative of a type of user-activity indicating one of walking or running,
  determining whether the electronic device is hand-held based on the sensor data;
  in response to determining the electronic device is not hand-held, operating the electronic device in the low-power state; and
  in response to determining the electronic device is hand held, operating the electronic device is one of the intermediate-power state and the working-power state.

13. The method of claim 12, wherein the determining whether the electronic device is hand-held includes implementing a Machine Learning algorithm.

14. An electronic device, comprising:
sensing circuitry, which, in operation, generates sensor data; and
control circuitry coupled to the sensing circuitry, wherein the control circuitry, in operation:
  generates, based on generated sensor data, information indicative of movement of the electronic device, the information including information indicative of a change of inclination of the electronic device with respect to one or more planes orthogonal to a gravity vector acting on the electronic device, information indicative of a position of the electronic device on one or more of the one or more planes orthogonal to the gravity vector, and information indicative of a type of user-activity associated with the electronic device; and
  generates control signals to control operation of the electronic device in a plurality of different power states, the plurality of different power states including a working-power state, an intermediate-power state and a low-power state, wherein the generating control signals includes:
    generating control signals to cause operation in the low-power state based on one or more of the information indicative of an inclination change or the information indicative of a type of user-activity;
    generating control signals to cause a transition from operation in the low-power state to operation in the intermediate-power state based on the information indicative of a position of the electronic device; and
    generating control signals to cause a transition from operation in the intermediate-power state to operation in the working-power state based on an indication of user interaction with the electronic device, wherein
  the electronic device has a base portion and a lid portion; and
  the generating the information indicative of a change in inclination comprises:
    detecting a change in an angle between a plane of the base portion and a plane of the lid portion;
    in response to the detecting of the change in the angle, comparing the angle to a threshold angle; and
    generating the information indicative of the change in inclination based on the comparison.

15. The electronic device of claim 14, wherein the control circuitry, in operation, responds to an indication of a change of inclination by transitioning the electronic device to the low-power state.

16. The electronic device of claim 14, wherein the control circuitry, when the electronic device is operating in the intermediate-power state:
   starts a timer;
   in response to receiving an indication of user interaction with the electronic device before expiration of the timer, transitions from the intermediate-power state to the working-power state; and
   in response to expiration of the timer without receiving an indication of user interaction with the electronic device, transitions from the intermediate-power state to the low-power state.

17. The electronic device of claim 14, wherein the control circuitry, when the electronic device is operating in the working-power state or in the intermediate-power state:
   responds to an indication of a type of user-activity of walking by selectively transitioning to the low-power state based on the information indicative of a change of inclination; and
   responds to an indication of a type of user-activity of traveling in a vehicle by selectively transitioning to the low-power state based on the information indicative of a change of inclination.

18. The electronic device of claim 14, wherein the sensing circuitry comprises an inertial sensor of a triaxial type having a first detection axis, a second detection axis, and a third detection axis, wherein the control circuitry, in operation, responds to the information indicative of a type of user-activity indicating a steady-state user-activity by:
   acquiring respective acceleration values along the first, second and third detection axes;
   identifying a flat orientation of said electronic device when the respective acceleration values along the second and third detection axes are negligible with respect to the acceleration value along the first detection axis; and
   transitioning to the working-power state in response to identifying the flat orientation.

19. The electronic device of claim 18, wherein the control circuitry, in operation:
   identifies a not-flat orientation of said electronic device when the value along the first detection axis is negligible with respect to at least one of the respective values along the second and the third detection axes; and
   transitions the electronic device to the low-power state in response to the lid portion being closed, the not-flat orientation being identified and the information indicative of a type of user-activity indicating a steady-state user-activity.

20. The electronic device of claim 14, wherein the control circuitry, in operation:
   detects a relative orientation of the base portion with respect to the lid portion;
   compares the relative orientation with a threshold relative orientation to determine whether the lid is closed; and
   generates the control signals based on the comparing.

21. The electronic device of claim 20, wherein the control circuitry, in operation:
   determines whether the electronic device is hand-held based on the sensor data; and
   generates the control signals based on the determination of whether the electronic device is hand-held.

22. The electronic device of claim 14, wherein the control circuitry, in operation, implements a machine learning algorithm to determine whether the electronic device is hand-held.

23. A system, comprising:
   an application processor;
   sensing circuitry, which, in operation, generates sensor data; and
   control circuitry coupled to the sensing circuitry and to the application processor, wherein the control circuitry, in operation:
      generates, based on generated sensor data, information indicative of movement of the system, the information including information indicative of a change of inclination of the system with respect to one or more planes orthogonal to a gravity vector acting on the system, information indicative of a position of the system on one or more of the one or more planes orthogonal to the gravity vector, and information indicative of a type of user-activity associated with the system; and
      generates control signals to control operation of the system in a plurality of different power states, the plurality of different power states including a working-power state, an intermediate-power state and a low-power state, wherein the generating control signals includes:
         generating control signals to cause operation in the low-power state based on one or more of the information indicative of an inclination change or the information indicative of a type of user-activity;
         generating control signals to cause a transition from operation in the low-power state to operation in the intermediate-power state based on the information indicative of a position of the system; and
         generating control signals to cause a transition from operation in the intermediate-power state to operation in the working-power state based on an indication of user interaction with the system, wherein,
   the system has a base portion and a lid portion; and
   the control circuitry, in operation:
      detects a relative orientation of the base portion with respect to the lid portion;
      compares the relative orientation with a threshold relative orientation; and
      generates the control signals based on the comparing.

24. The system of claim 23, wherein the control circuitry, in operation:
   classifies user activity based on the sensor data; and
   generates the control signals based on the classifying.

25. A non-transitory computer-readable medium having contents which configure an electronic device to perform a method, the method comprising:
   generating, based on sensor data, information indicative of movement of the electronic device, the information including information indicative of a change of inclination of the electronic device with respect to one or more planes orthogonal to a gravity vector acting on the electronic device, information indicative of a position of the electronic device on one or more of the one or more planes orthogonal to the gravity vector, and information indicative of a type of user-activity associated with the electronic device; and
   managing transitions of the electronic device between a plurality of different power states, the plurality of different power states including a working-power state, an intermediate-power state and a low-power state, wherein the managing transitions includes:

managing transitions to the low-power state based on one or more of the information indicative of an inclination change or the information indicative of a type of user-activity;

managing transitions from the low-power state to the intermediate power state based on the information indicative of a position of the electronic device; and managing transitions from the intermediate-power state to the working-power state based on an indication of user interaction with the electronic device, wherein:

the electronic device comprises a base portion and a lid portion; and the method comprises:

detecting a relative orientation of the base portion with respect to the lid portion;

comparing the relative orientation with a threshold relative orientation; and generating the control signals based on the comparing.

26. The non-transitory computer-readable medium of claim 25 wherein the contents comprising instructions executed by control circuitry of the electronic device.

\* \* \* \* \*